(12) United States Patent
Svrcek et al.

(10) Patent No.: US 10,443,727 B2
(45) Date of Patent: Oct. 15, 2019

(54) SEALING RING ASSEMBLIES CONFIGURED FOR PRESSURE LOCKING

(71) Applicant: EtaGen, Inc., Menlo Park, CA (US)

(72) Inventors: Matt Svrcek, Redwood City, CA (US); Jodie Prudhomme, San Francisco, CA (US)

(73) Assignee: EtaGen, Inc., Menlo Park, CA (US)

( * ) Notice: Subject to any disclaimer, the term of this patent is extended or adjusted under 35 U.S.C. 154(b) by 0 days.

(21) Appl. No.: 16/100,131

(22) Filed: Aug. 9, 2018

(65) Prior Publication Data

US 2019/0049013 A1 Feb. 14, 2019

Related U.S. Application Data

(60) Provisional application No. 62/543,302, filed on Aug. 9, 2017, provisional application No. 62/543,299, filed on Aug. 9, 2017.

(51) Int. Cl.
*F16J 9/28* (2006.01)
*F16J 9/16* (2006.01)
(Continued)

(52) U.S. Cl.
CPC ............... *F16J 9/28* (2013.01); *F04B 1/00* (2013.01); *F04B 1/0448* (2013.01); *F15B 15/00* (2013.01);
(Continued)

(58) Field of Classification Search
CPC . F16J 9/16; F16J 9/00; F16J 9/28; F16J 9/22; F16J 15/3488; F02F 5/00; F04B 39/042
(Continued)

(56) References Cited

U.S. PATENT DOCUMENTS

| 4,781 A | * | 10/1846 | Richards | ............... | F16J 9/00 |
| | | | | | 92/257 |
| 1,251,630 A | * | 1/1918 | Brandum | ............... | F16J 9/16 |
| | | | | | 277/446 |

(Continued)

FOREIGN PATENT DOCUMENTS

| GB | 861877 | | 3/1961 | | |
| JP | 54038430 A | * | 3/1979 | ............... | F16J 9/00 |
| JP | 2012163118 A | * | 8/2012 | ............... | F16J 9/14 |

OTHER PUBLICATIONS

U.S. Appl. No. 61/100,092, EtaGen, Inc., Aug. 9, 2018.
International Search Report and Written Opinion in Application No. PCT/US2018/046121, dated Nov. 6, 2018 (11 pages).

*Primary Examiner* — Eugene G Byrd
(74) *Attorney, Agent, or Firm* — Haley Guiliano LLP

(57) ABSTRACT

A sealing ring includes a first sealing element having a first mating surface and a second sealing element having a second mating surface. A high-pressure boundary extends across at least a portion of the first sealing element and across at least a portion of the second sealing element, and a low-pressure boundary extends across at least a portion of the first sealing element and across at least a portion of the second sealing element. The first mating surface, the second mating surface, or both, includes a recess open to the low-pressure boundary and not open to the high-pressure boundary. The recess may include a groove, for example. The first mating surface is sealed against the second mating surface by a first force acting on the first sealing element and a second force acting on the second sealing element. These forces act to pressure-lock the assembly.

28 Claims, 12 Drawing Sheets

(51) Int. Cl.
  *F16J 9/22* (2006.01)
  *F16J 15/34* (2006.01)
  *F04B 1/00* (2006.01)
  *F04B 1/04* (2006.01)
  *F16F 9/36* (2006.01)
  *F16J 1/09* (2006.01)
  *F15B 15/00* (2006.01)

(52) U.S. Cl.
  CPC ............... *F16F 9/368* (2013.01); *F16J 1/09* (2013.01); *F16J 9/16* (2013.01); *F16J 9/22* (2013.01); *F16J 15/3488* (2013.01)

(58) Field of Classification Search
  USPC .......................................... 277/434
  See application file for complete search history.

(56) References Cited

U.S. PATENT DOCUMENTS

| | | | | |
|---|---|---|---|---|
| 1,911,736 A * | 5/1933 | Wilkening | | F16J 9/063 |
| | | | | 277/457 |
| 3,186,723 A * | 6/1965 | Wagner | | F16J 15/3488 |
| | | | | 277/347 |
| 3,305,241 A * | 2/1967 | Hart | | F16J 15/26 |
| | | | | 277/547 |
| 3,743,303 A * | 7/1973 | Pope | | F01D 11/00 |
| | | | | 277/422 |
| 4,185,842 A * | 1/1980 | Magara | | F02G 1/0535 |
| | | | | 277/491 |
| 4,455,974 A | 6/1984 | Shapiro et al. | | |
| 4,582,328 A * | 4/1986 | Howarth | | F16J 9/08 |
| | | | | 277/451 |
| 4,741,543 A * | 5/1988 | Geffroy | | F16J 9/063 |
| | | | | 277/434 |
| 5,921,553 A * | 7/1999 | Klein | | F16J 9/16 |
| | | | | 277/435 |
| 6,045,135 A * | 4/2000 | Feistel | | F16J 9/16 |
| | | | | 277/434 |
| 6,059,293 A * | 5/2000 | Azibert | | F16J 15/3488 |
| | | | | 277/358 |
| 6,068,263 A * | 5/2000 | Azibert | | F16J 15/3488 |
| | | | | 277/370 |
| 6,322,080 B1 | 11/2001 | Feistel | | |
| 6,340,161 B1 * | 1/2002 | Zitting | | F16J 9/06 |
| | | | | 277/459 |
| 6,439,578 B1 * | 8/2002 | Radcliffe | | F16J 15/24 |
| | | | | 277/434 |
| 6,457,722 B1 * | 10/2002 | Feistel | | F16J 15/26 |
| | | | | 277/493 |
| 8,177,237 B2 * | 5/2012 | Lindner-Silwester | | F16J 9/14 |
| | | | | 277/435 |
| 8,807,571 B2 | 8/2014 | Chalk et al. | | |
| 9,133,933 B1 * | 9/2015 | Feistel | | F16J 9/18 |
| 9,388,902 B2 * | 7/2016 | Sueyoshi | | F15B 15/1452 |
| 9,856,821 B1 * | 1/2018 | Svrcek | | F02F 3/28 |
| 2003/0006562 A1 * | 1/2003 | Feistel | | F16J 9/02 |
| | | | | 277/434 |
| 2003/0127802 A1 * | 7/2003 | Bennitt | | F16J 9/06 |
| | | | | 277/493 |
| 2005/0051970 A1 * | 3/2005 | Edelmann | | F16J 9/16 |
| | | | | 277/435 |
| 2011/0049811 A1 * | 3/2011 | Sueyoshi | | F15B 15/1452 |
| | | | | 277/434 |
| 2014/0090554 A1 * | 4/2014 | Chalk | | F16J 9/12 |
| | | | | 92/172 |
| 2014/0298984 A1 * | 10/2014 | Hofbauer | | F16J 9/24 |
| | | | | 92/169.1 |

* cited by examiner

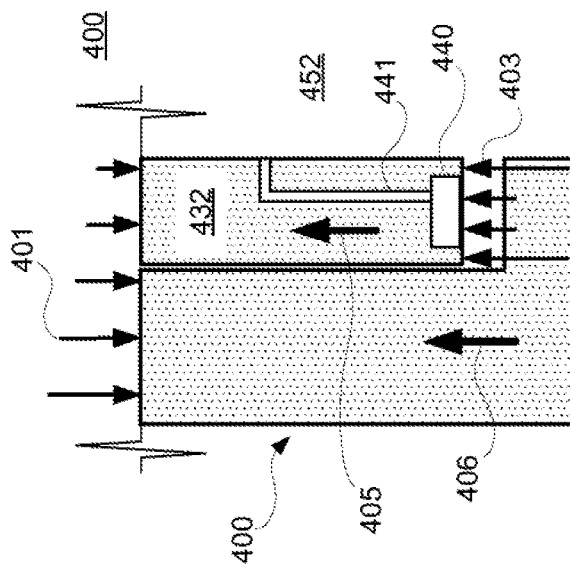
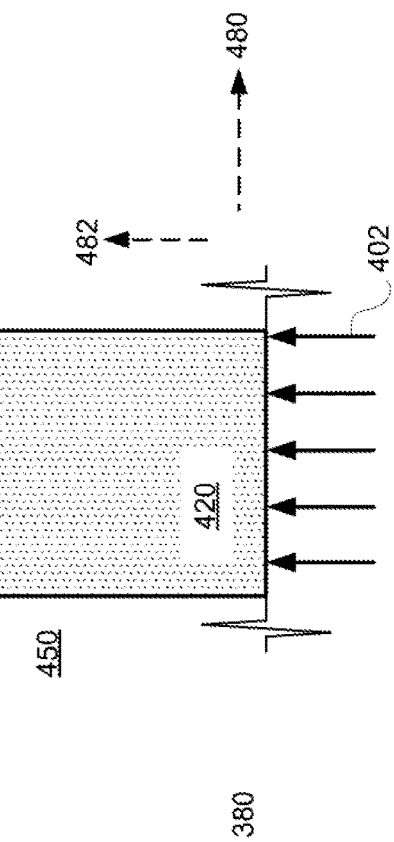
FIG. 4
FIG. 3

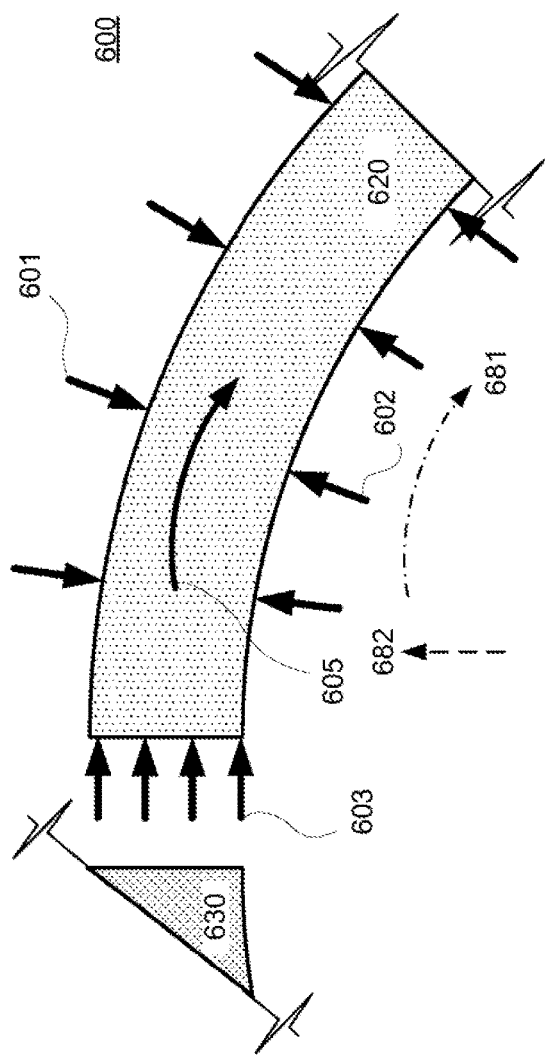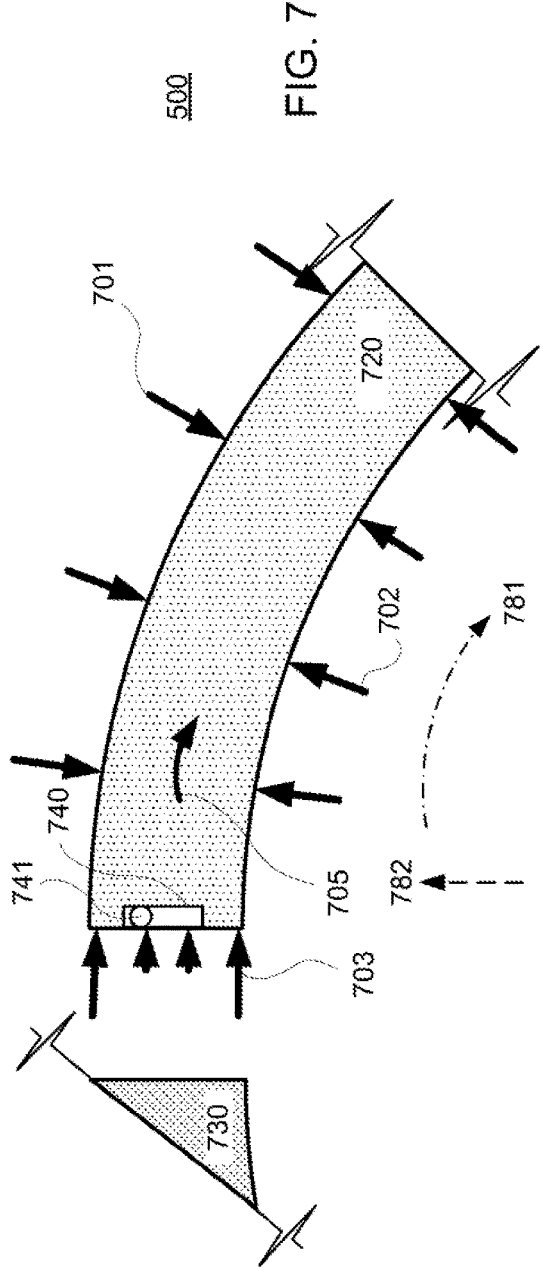

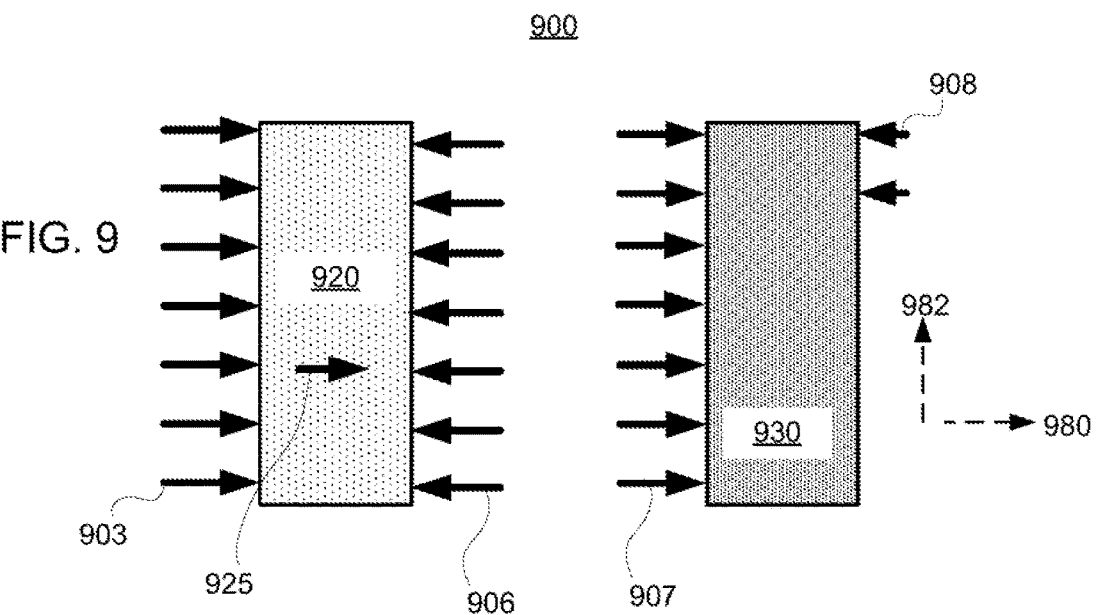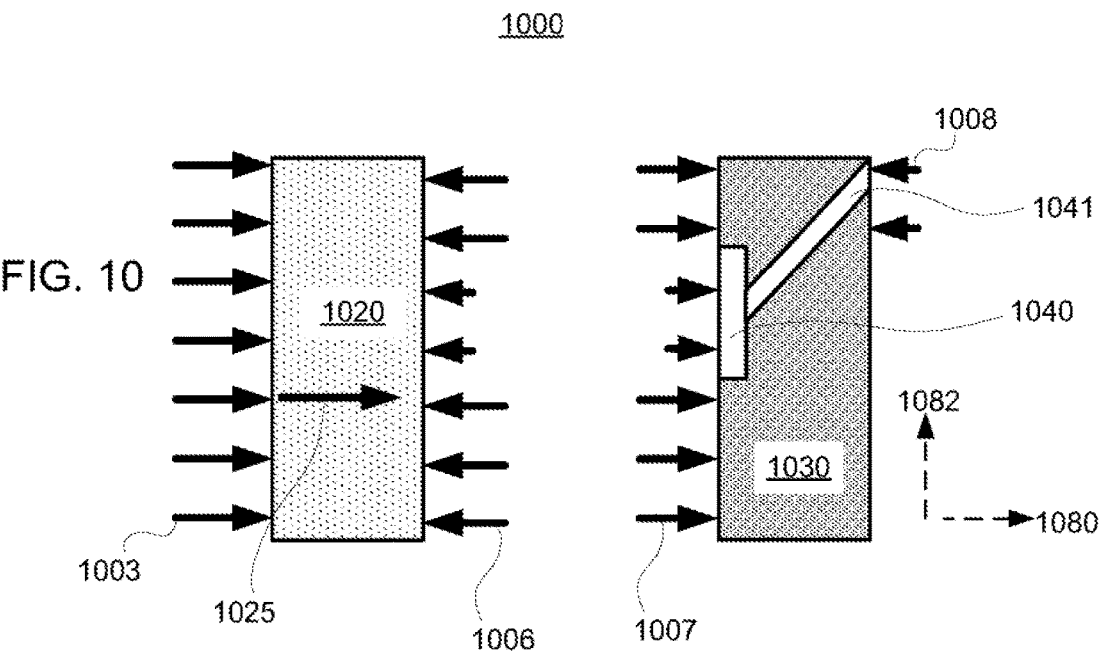

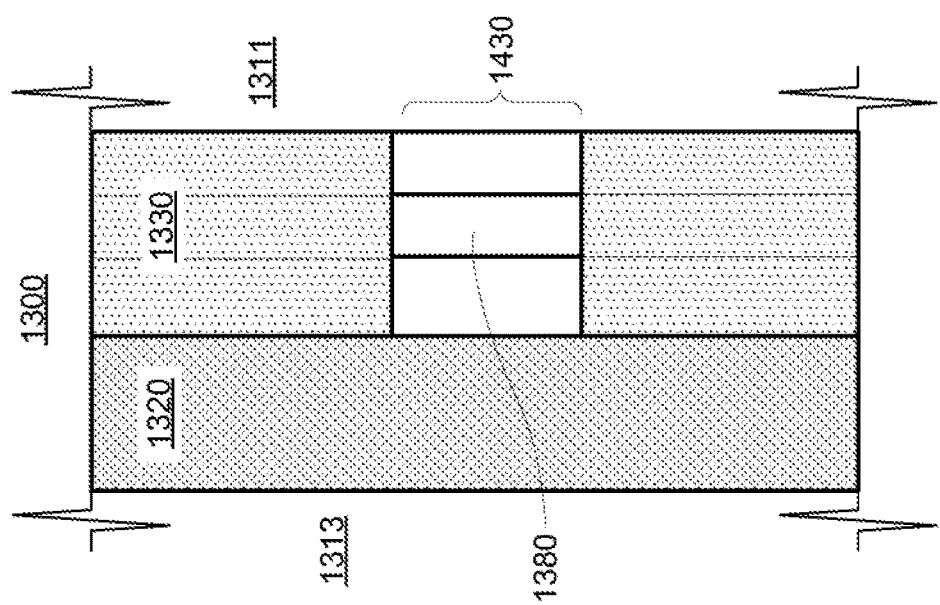
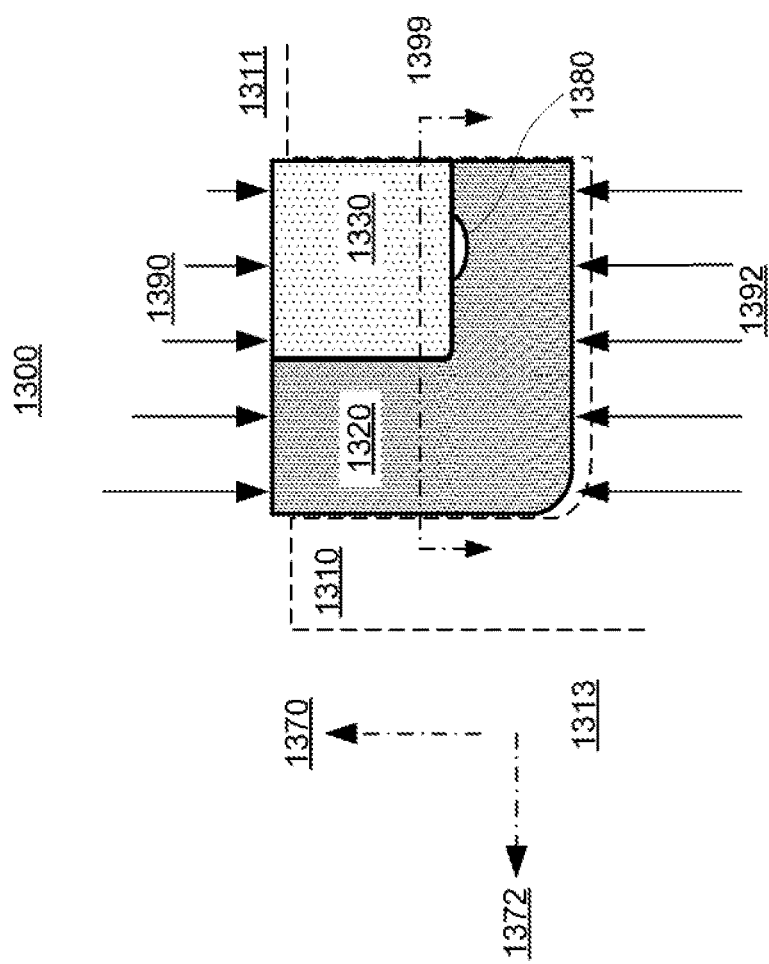

SEALING RING ASSEMBLIES CONFIGURED FOR PRESSURE LOCKING

The present disclosure is directed towards sealing ring assemblies and, more particularly, the present disclosure is directed towards sealing ring assemblies that include pressure-locking features. This application claims the benefit of U.S. Provisional Patent Application Nos. 62/543,302 filed Aug. 9, 2017, and 62/543,299 filed Aug. 9, 2017, the disclosures of which are hereby incorporated by reference herein in their entirety.

BACKGROUND

For economic reasons, it is desirable for a seal of a piston-cylinder assembly to function for as long as possible before needing replacement. For example, a typical target might be hundreds or thousands of hours of operation. During these run hours the seal wears down radially, and gaps may form between portions of the seal. The total circumferential arc length of the resulting gap(s) opens by $2*\pi*\Delta R$, where $\Delta R$ is the radial wear of the seal. With a self-lubricating material in which the wear rate is relatively high, the gap opens by an amount that results in unacceptable leakage flow, thus limiting the effective operating life of the seal. Accordingly, it would be desired for a seal to maintain performance during its lifetime. Surfaces of a seal may be exposed to a large range of pressures and contact forces.

SUMMARY

In some embodiments, the present disclosure is directed to a sealing ring assembly. The sealing ring assembly includes a first sealing element having a first mating surface. The sealing ring assembly also includes a second sealing element having a second mating surface. The sealing ring assembly also includes a high-pressure boundary extending across at least a portion of the first sealing element and across at least a portion of the second sealing element. The sealing ring assembly also includes a low-pressure boundary extending across at least a portion of the first sealing element and across at least a portion of the second sealing element. At least one of the first mating surface and the second mating surface includes a recess open to the low-pressure boundary and not open to the high-pressure boundary, such that the first mating surface is sealed against the second mating surface by a first force acting on the first sealing element and a second force acting on the second sealing element.

In some embodiments, the first force acting on the first sealing element is directed opposite to the second force acting on the second sealing element.

In some embodiments, the recess is configured to cause the first and second forces to maintain a relative position of the first sealing element and the second sealing element.

In some embodiments, the first mating surface is sealed against the second mating surface in at least one of the radial, axial, and azimuthal direction. For example, the first and second surfaces may be flat, angled, curved, compound, or a combination thereof and may seal against each other in one or more directions at all, of or part of, the interface.

In some embodiments, the sealing ring assembly includes a rear axial face configured to seal against a land of a piston. In some embodiments, the sealing ring assembly includes a radially outer face configured to seal against a bore of a cylinder between the high-pressure boundary and the low-pressure boundary.

In some embodiments, the recess includes a groove.

In some embodiments, the recess is a first recess of the first mating surface, and wherein the second mating surface includes a second recess configured to interface with the first recess.

In some embodiments, the first sealing element includes a first ring segment, and the second sealing element includes a second ring segment.

In some embodiments, the first sealing element includes a ring segment, and the second sealing element includes a gap cover element.

In some embodiments, at least one of the first and second sealing elements includes a radial pressure-balancing feature configured to cause a radially inward force. For example, in some embodiments, the radially inward force reduces wear of the sealing ring assembly.

In some embodiments, the first and second mating surfaces seal against each other to prevent the recess from being open to the high-pressure boundary.

In some embodiments, the present disclosure is directed to a piston assemble including a piston and a sealing ring assembly. The piston includes a circumferential groove and the piston is configured to move axially within a bore of a cylinder. The sealing ring assembly is arranged in the circumferential groove and is configured to seal against the bore. The sealing ring assembly includes a first sealing element having a first mating surface and a second sealing element having a second mating surface. The sealing ring assembly also includes a high-pressure boundary extending across at least a portion of the first sealing element and across at least a portion of the second sealing element, and a low-pressure boundary extending across at least a portion of the first sealing element and across at least a portion of the second sealing element. At least one of the first mating surface and the second mating surface includes a recess open to the low-pressure boundary and not open to the high-pressure boundary such that the first mating surface is sealed against the second mating surface by a first force acting on the first sealing element and a second force acting on the second sealing element.

In some embodiments, the present disclosure is directed to a device including a cylinder, a piston, and a sealing ring assembly. The cylinder includes a bore having a high-pressure region and a low-pressure region. The piston includes a circumferential groove and the piston is configured to move axially within the bore. The sealing ring assembly is arranged in the circumferential groove and is configured to seal against the bore to define the high-pressure region and the low-pressure region. The sealing ring assembly includes a first sealing element having a first mating surface and a second sealing element having a second mating surface. At least one of the first and second mating surfaces includes a recess open to the low-pressure region and not open to the high-pressure region, such that the first mating surface is sealed against the second mating surface by a first force acting on the first sealing element and a second force acting on the second sealing element.

In some embodiments, the circumferential groove includes an axially rear land, and the sealing ring assembly is configured to seal against the axially rear land.

In some embodiments, the first force acting on the first sealing element is directed opposite to the second force acting on the second sealing element.

In some embodiments, the recess is configured to cause the first and second forces to maintain a relative position of the first sealing element and the second sealing element.

In some embodiments, the sealing ring assembly includes a radially outer face configured to seal against the bore.

In some embodiments, the sealing ring assembly includes a first boundary extending across at least a portion of the first sealing element and at least a portion of the second sealing element, and that is open to the high-pressure region. In some embodiments, the sealing ring assembly also includes a second boundary extending across at least a portion of the first sealing element and at least a portion of the second sealing element, and that is open to the low-pressure region, wherein the recess is open to the first boundary and not open to the second boundary.

In some embodiments, the present disclosure is directed to a sealing ring assembly including a first ring and a second ring. The first ring includes an extension extending axially rearwards, which includes a radially outward surface. The second ring includes an inner radial surface configured to interface to the radially outward surface. The sealing ring assembly also includes a groove extending circumferentially along at least one of the radially outward surface of the extension and the inner radial surface of the second ring. For example, the groove may be included in either or both of the first ring and the second ring.

In some embodiments, the groove is configured to be open to a low-pressure boundary of the sealing ring assembly.

In some embodiments, the second ring includes a pocket that extends circumferentially in an outermost radial surface of the second ring, and wherein the pocket is configured to receive high pressure gas. For example, the outermost radial surface is configured to seal against a bore of a cylinder.

In some embodiments, the second ring includes an orifice that is configured to allows gas to flow from the high-pressure boundary to the pocket. In some embodiments, for example, the second ring includes an orifice, slot, or other through feature.

In some embodiments, the sealing ring assembly is configured to be arranged in a ring groove of a piston. The sealing ring assembly includes an anti-rotation feature to prevent substantial azimuthal movement of the sealing ring assembly.

In some embodiments, the first ring includes an outermost radial surface, and wherein the outer radial surface of the extension is radially inward of the outer radial surface. For example, the outermost radial surface is configured to seal against the bore of the cylinder.

In some embodiments, at least one of the first ring and the second ring includes a self-lubricating material. For example, the first ring, the second ring, or both may include graphite or other ceramic, a polymer, or a combination thereof.

In some embodiments, the sealing ring assembly is configured for operation without liquid lubricant. For example, in some embodiments, the sealing ring assembly is configured for oil-less operation.

In some embodiments, the first ring includes at least two first ring segments, which are arranged such that respective ends of the at least two first ring segments form at least one interface between each other.

In some embodiments, the second ring comprises at least two second ring segments, which are arranged such that respective ends of the at least two second ring segments form at least one interface between each other.

In some embodiments, the present disclosure is directed to a piston assembly including a piston and a sealing ring assembly. The piston includes a ring groove. The sealing ring assembly is arranged in the ring groove and includes a first ring and a second ring. The first ring includes an extension extending axially rearwards, which includes a radially outward surface. The second ring includes radially inner surface configured to interface to the radially outward surface of the extension. The sealing ring assembly also includes a groove extending azimuthally along at least one of the radially outer surface of the extension and the inner radial surface of the second ring.

In some embodiments, the piston is an open-faced piston.

In some embodiments, the present disclosure is directed to a device including a cylinder, a piston, and a sealing ring assembly. The cylinder includes a bore. The piston includes a ring groove and is configured to travel within the bore along an axis of the bore. The sealing ring assembly is arranged in the ring groove and includes a first ring and a second ring. The first ring includes an extension extending axially rearwards, which includes a radially outward surface. The second ring includes an inner radial surface configured to interface to the radially outward surface. The sealing ring assembly also includes a groove extending azimuthally along at least one of the radially outer surface of the extension and the inner radial surface of the second ring.

In some embodiments, the sealing ring assembly is configured to seal between the bore and the piston. For example, the sealing ring assembly is configured to seal a high-pressure region in the bore from a low-pressure region in the bore.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

FIG. 3 shows a cross-sectional view of an illustrative sealing ring assembly exposed to forces, in accordance with some embodiments of the present disclosure;

FIG. 4 shows a cross-sectional view of an illustrative sealing ring assembly exposed to forces, in accordance with some embodiments of the present disclosure;

FIG. 6 shows a cross-sectional exploded view of a portion of an illustrative sealing ring assembly exposed to forces, in accordance with some embodiments of the present disclosure;

FIG. 7 shows a cross-sectional exploded view of the portion of an illustrative sealing ring assembly exposed to forces, in accordance with some embodiments of the present disclosure;

FIG. 9 shows a cross-sectional exploded view of an illustrative sealing ring assembly exposed to forces, in accordance with some embodiments of the present disclosure;

FIG. 10 shows a cross-sectional exploded view of an illustrative sealing ring assembly exposed to forces, in accordance with some embodiments of the present disclosure;

FIG. 13 shows a cross section view of an illustrative sealing ring assembly including a feature for pressure locking, in accordance with some embodiments of the present disclosure;

FIG. 14 shows a cross section view of the illustrative sealing ring assembly of FIG. 13 showing a rear ring gap, in accordance with some embodiments of the present disclosure;

DETAILED DESCRIPTION

Figure 1:
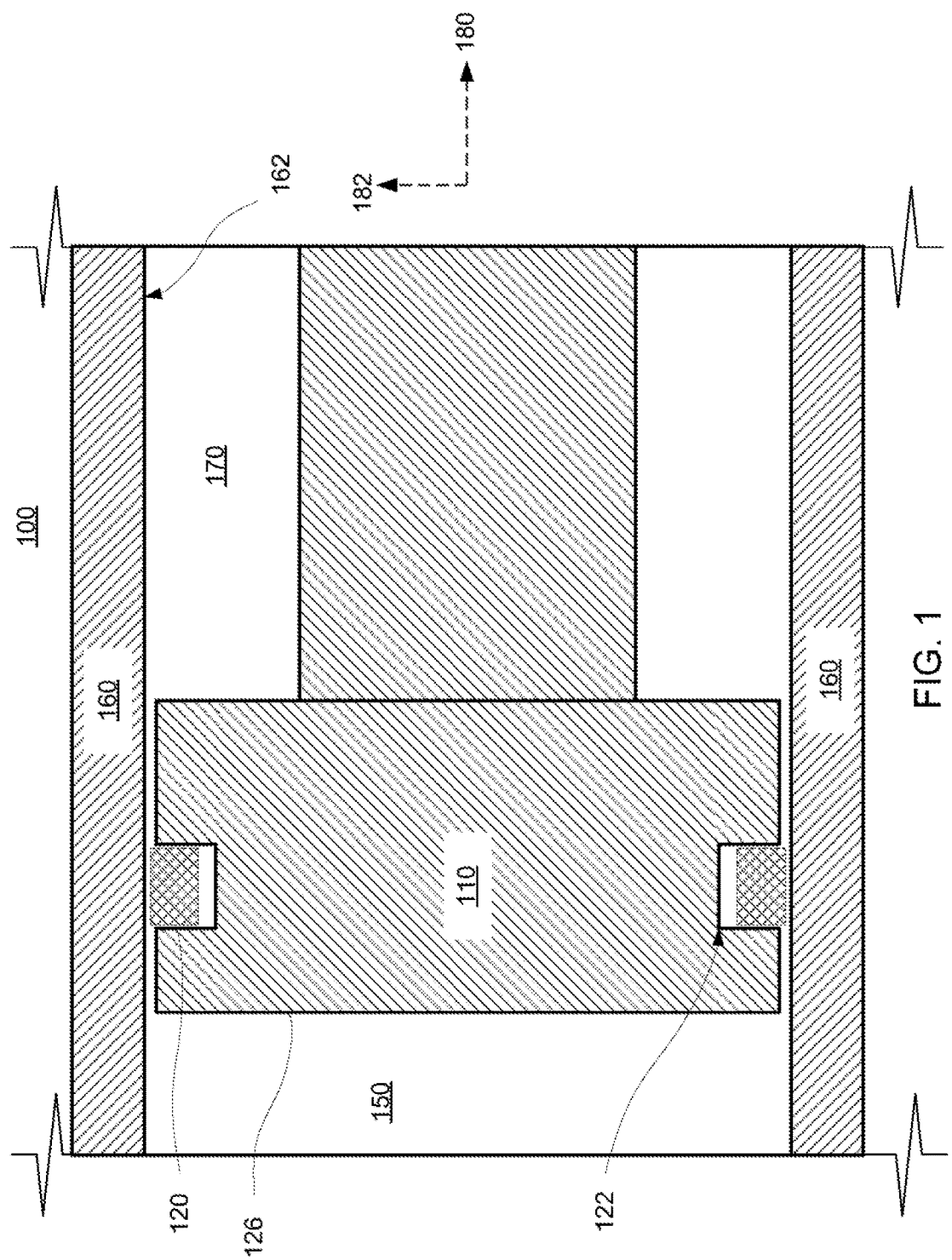
FIG. 1 shows a cross-sectional view of an illustrative piston and cylinder assembly, in accordance with some embodiments of the present disclosure.

In some embodiments, the present disclosure is directed to a sealing ring assembly that is configured to separate a relatively higher-pressure region from a relatively lower-pressure region. The sealing ring assembly may include sealing elements such as, for example, one or more rings, one or more segments thereof, one or more gap covers, any other suitable components, or any combination thereof. There may be one or more surfaces of a first sealing element that must remain in contact (e.g., at an entire surface or any suitable portion thereof) with one or more corresponding surfaces of a second sealing element in order to sufficiently maintain sealing functionality. As the sealing ring assembly experiences wear, moves to accommodate changes in the cylinder diameter, or otherwise is subjected to geometric changes or changes in forces, some of the sealing elements may move relative to one another. In some embodiments, the present disclosure is directed to a pressure-locking feature that is configured to ensure that at least some of the mating surfaces of the sealing elements stay in contact to maintain a seal. For example, the mating surfaces may provide a seal between a high-pressure region and a low-pressure region. In an illustrative example, either or both of two mating surfaces include a channel or other recess that is open to the lower-pressure region. The geometry of the channel (e.g., area, volume, length, aspect ratio, surface-to-volume ratio) is such that the pressure acting on a portion of the mating interface is at a pressure lower than the pressure in the higher-pressure region. The surface in which the channel is included forms a continuous perimeter of contact with the mating surface (e.g., around the channel on all sides except in the location at which the channel is open to the lower-pressure region). For example, the channel does not create a significant short-circuiting flow path between the higher-pressure and lower-pressure regions (e.g., a leak). The particular fraction of the surface area exposed to the low-pressure channel is chosen such that the sum of pressure forces acting on the two segments (e.g. from the surfaces exposed to the higher-pressure region) has a net resultant force that causes the two segments to contact each other at the surfaces containing the pressure-locking feature. As such, the pressures and resulting contact forces to which the sealing ring assembly is exposed act to maintain the configuration of the sealing elements of the sealing ring assembly.

The term "seal" as used herein, refers to the creation, maintenance, or both of a high-pressure region and a low-pressure region. For example, a seal may include a sealing ring assembly that is configured to reduce a leakage rate of gas from a high-pressure region to a low-pressure region, by limiting flow between a high-pressure boundary and a low-pressure boundary of the seal. Accordingly, a seal can be defined in terms of its constraints on a leakage rate. It will be understood that a seal, or sealing ring assembly, as described herein, may have any suitable corresponding leakage rate. For example, in some circumstances, a relatively worse seal may allow more leakage, but may be acceptable based on some performance criterion. In a further example, a sealing ring assembly configured for high efficiency operation of a piston and cylinder device may have a relatively low leakage rate (e.g., be a more effective seal).

As used herein, a "ring segment" shall refer to a sealing element extending for an azimuthal angle greater than zero degrees, having a radially outer surface, and configured to seal at least along a portion of the radially outer surface against a bore. A ring segment may include end faces, if not azimuthally contiguous around the full bore.

As used herein, a "ring" shall refer to a sealing element including at least one ring segment, which may be, but need not be, azimuthally contiguous along a bore. For example, a ring may include one ring segment, in which case these terms overlap. In a further example, a ring may include four ring segments, in which case the ring refers to the collective of the four ring segments. A ring may include, but need not include, one or more interfaces between one or more ring segments. A "ring" shall also refer to a sealing element including at least one ring segment configured to seal against a land of a piston.

As used herein, a "gap cover element" shall refer to a sealing element configured to seal against one or more ring segments at an interface, and to seal against at least a portion of a bore during wear of the one or more ring segments. While a gap cover element may function as a ring segment as the ring wears, for purposes of the discussion in the present disclosure, a gap cover element is not considered to be a ring segment for purposes of clarity.

As used herein, a "sealing ring assembly" shall refer to an assembly of one or more rings, and sometimes also one or more gap covers elements, configured to engage with a piston and configured to seal between a high-pressure region and a low-pressure region of a cylinder. For example, a single ring segment may be a ring and a sealing ring assembly. In a further example, several ring segments and corresponding gap covers may be a sealing ring assembly.

As used herein, a "pressure-locking feature" shall refer to a feature included in at least one component of a sealing ring assembly that provides pressure locking functionality. As used herein, "pressure-locking" shall refer to the action of causing a resultant force on one or more components of a sealing ring assembly to maintain (or otherwise control) a relative geometric relationship between components of the sealing ring assembly, apply a force pushing components of the sealing ring assembly together, or both, during operation. The action of differential pressure across a sealing element may cause a resultant force that helps maintain the relative geometric relationship.

FIG. 1 shows a cross-sectional view of illustrative piston and cylinder assembly 100, in accordance with some embodiments of the present disclosure. Cylinder 160 may include bore 162, which is the inner cylindrical surface in which piston assembly 110 travels. Piston assembly 110 may include piston 126, which includes a sealing ring groove 122, in which sealing ring assembly 120 is configured to ride. As piston assembly 110 translates along the axial direction shown by axis 180 (e.g., during an engine cycle), in cylinder 160, the gas pressure in high-pressure region 150 may change (high-pressure region 150 may be closed with a cylinder head or an opposing piston). For example, as piston assembly 110 moves opposite the direction of axis 180 (i.e., to the left in FIG. 1), the pressure in high-pressure region 150 may increase. Low-pressure region 170, located to the rear of sealing ring assembly 120 may be at a gas pressure below the pressure of high-pressure region 150 for at least some, if not most, of a piston stroke or cycle of piston and cylinder assembly 100. The pressure ranges in high-pressure region 150 and low-pressure region 170 may be any suitable ranges (e.g., sub-atmospheric pressure to well over 250 bar), and may depend on compression ratio, breathing details (e.g., boost pressure, pressure waves, port timing), losses, thermochemical properties of gases, and reaction thereof. Accordingly, the sealing ring assemblies described herein may be used to seal any suitable high-pressure region and low-pressure region, having any suitable pressure ranges. It will be understood that the "front" of sealing ring assembly 120 refers to the face axially nearest high-pressure region 150, and the "rear" of sealing ring assembly 120 refers to the face axially nearest low-pressure region 170.

It will be understood that unless otherwise specified, all pressures referred to herein are in absolute units (e.g., not gage or relative).

It will be understood that high-pressure and low-pressure may refer to transient pressure states of a piston and cylinder device. For example, referencing an engine cycle, the high-pressure side of a sealing ring assembly may have a pressure greater than a low-pressure side of the sealing ring assembly for most of the engine cycle (e.g., except possibly during breathing or near-breathing portions of the cycle). Accordingly, high-pressure and low pressure are relative and depend on the conditions of the gas being sealed.

A sealing ring assembly may be used to seal a high pressure and a low-pressure region, each operating in any suitable pressure range. It will also be understood that a sealing ring assembly may seal differently at different positions in a cycle. It will be further understood that a low-pressure region may include a pressure greater than a pressure of a high-pressure region for some of a piston stroke or cycle of a piston and cylinder assembly. For example, a sealing ring assembly may always seal a high-pressure region from a low-pressure region. In a further example, a sealing ring assembly may seal a high-pressure region from a low-pressure region as long as the pressure in the high-pressure region is greater than the pressure in the low-pressure region. In a further example, a sealing ring assembly may seal a high-pressure region from a low-pressure region as long as the pressure in the high-pressure region is greater than the pressure in the low-pressure region, and conversely, seal a low-pressure region from a high-pressure region as long as the pressure in the low-pressure region is greater than the pressure in the high-pressure region.

In some embodiments, sealing ring assembly 120 may deposit material on bore 162 of cylinder 160 (e.g., include a self-lubricating material). Deposited material may lubricate the bore-to-sealing ring assembly interface between bore 162 and sealing ring assembly 120 (e.g., provide a dry lubricant). Accordingly, in some embodiments, piston and cylinder assembly 100 may operate without a liquid for lubrication (e.g., oil).

In some embodiments, piston 126 may be an open-faced piston. For example, piston 126 may include openings, cutouts, or other fluid paths from high pressure region 150 to ring groove 122. Accordingly, in some embodiments employing an open-faced piston, the inner radial surfaces (e.g., referencing axis 182 in the radial direction in FIG. 1) of sealing ring assembly 120 may be exposed to gas pressure of high pressure region 150.

Figure 2:
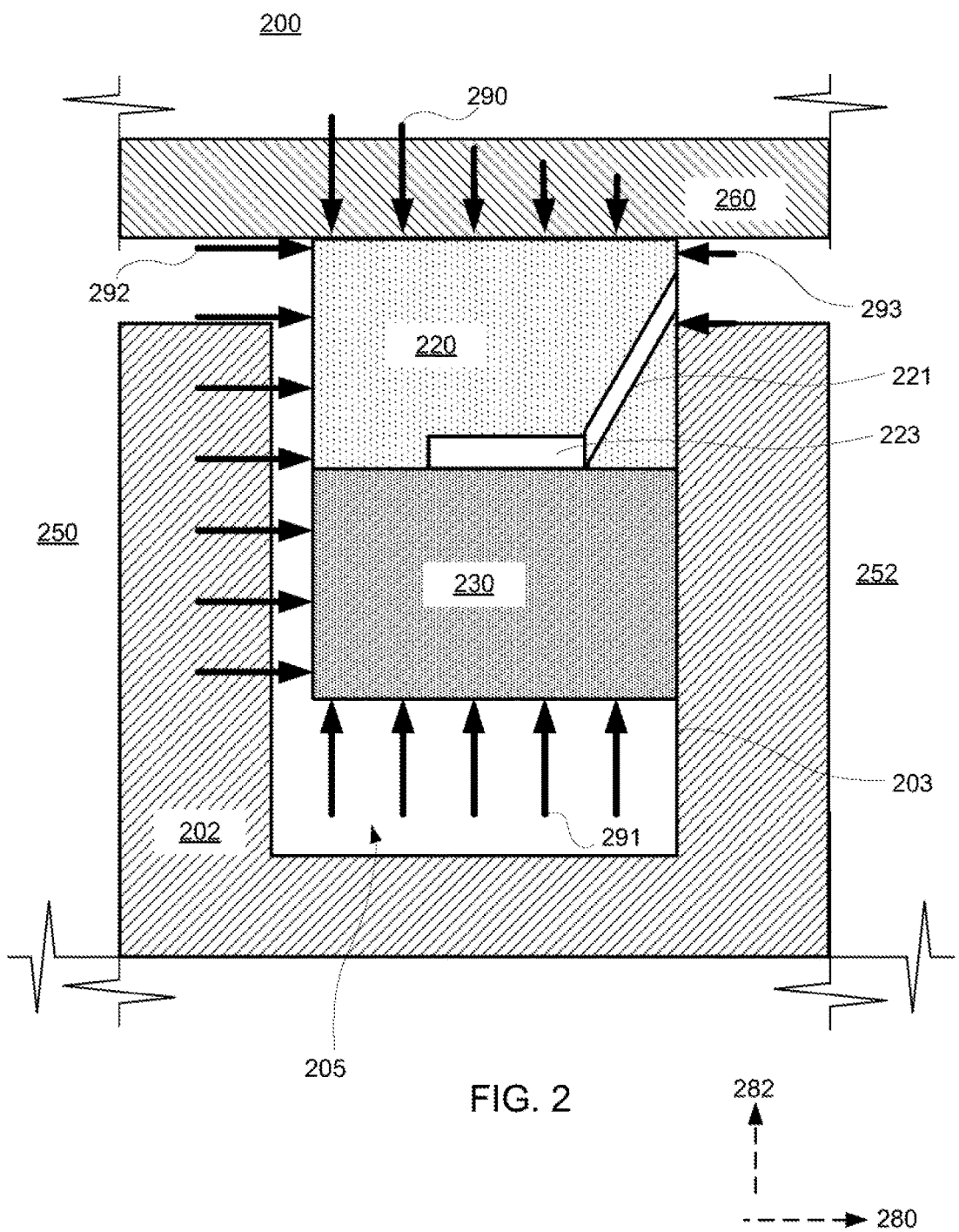
FIG. 2 shows a cross-sectional view of an illustrative piston and cylinder assembly, with a sealing ring assembly exposed to pressure forces, in accordance with some embodiments of the present disclosure.

FIG. 2 shows a cross-sectional view of illustrative piston and cylinder assembly 200, with a sealing ring assembly exposed to pressure forces, in accordance with some embodiments of the present disclosure. FIG. 2 shows a view directed azimuthally, with axis 282 directed in the radial direction, and axis 280 directed axially. Ring 220 and ring 230 constitute the sealing ring assembly, and each may include one or more ring segments. Although not shown in FIG. 2, either or both of ring 220 and 230 may include one or more gap cover elements. The sealing ring assembly is arranged in groove 205 of piston 202 and is configured to seal against land 203. While only pressure forces are illustrated in FIG. 2, it will be understood that the sealing ring assembly may experience contact forces from a bore, a piston land, another sealing ring assembly, or a combination thereof. The sealing ring seals high-pressure region 250 from low-pressure region 252 against cylinder 260 (e.g., against a bore of cylinder 260). Accordingly, the sealing ring assembly includes a high-pressure boundary exposed to high-pressure region 250 and a low-pressure boundary exposed to low-pressure region 252. As illustrated in FIG. 2, the sealing ring assembly is exposed to force 292 (i.e., directed axially rearward from high-pressure region 250), force 291 (i.e., directed radially outwards from high-pressure region 250), force 290 (i.e., directed radially inwards from pressure in a clearance gap between the sealing ring assembly and the cylinder 260), and force 293 (i.e., directed axially forward from pressure in low-pressure region 252). It will be understood that forces may be present in the azimuthal direction but are not shown in FIGS. 2-4 for simplicity. Ring 220 includes recess 223, which is coupled to low-pressure region 252 by passage 221. Forces can also be applied at the interface between rings 220 and 230. For example, if ring 220 and ring 230 are not accelerating relative to piston 202, or each other, then the forces on each of ring 220 and 230 balance in all directions. Further description of interfacial forces is provided in the context of FIGS. 3-4.

FIG. 3 shows a cross-sectional view of a portion of an illustrative sealing ring assembly 300 exposed to forces, in accordance with some embodiments of the present disclosure. As illustrated, only radial pressure forces acting on sealing ring assembly 300 are shown in FIG. 3, although axial pressure forces and axial and radial contact forces may be present during operation (e.g., from contact with a bore, a piston land, other sealing element, or other surface). For example, contact forces may have magnitudes and directions that balance the pressure forces in each direction (e.g., such that ring segments 320 and 332 do not move relative to one another). FIG. 3 shows a view directed azimuthally, with axis 382 directed in the radial direction, and axis 380 directed axially. Sealing ring assembly 300 includes a first ring and a second ring. The first ring includes ring segment 320, and the second ring includes ring segment 332. Sealing ring assembly 300 is configured to seal between high-pressure region 350 and low-pressure region 352 (e.g., in the bore of a cylinder). Force 302, directed radially outward, is caused by pressure forces from high-pressure region 350 acting on a portion of a high-pressure boundary of the sealing ring assembly 300. Force 301, directed radially inward, is caused by pressure forces from a clearance gap, asperities, or both, between sealing ring assembly 300 and a cylinder bore. Force 303, acting on ring segment 332, is caused by gas pressure from gas of high-pressure region 350 in a gap between ring segments 320 and 332 (e.g., a similar force may act on ring segment 320 in the opposite direction). Resultant force 305 is the net radial force experienced by ring segment 332 from pressure forces during operation. For example, for a larger resultant force 305, the larger the contact force from a bore (e.g., and increased wear rate) that may occur during operation.

FIG. 4 shows a cross-sectional view of a portion of an illustrative sealing ring assembly 400 exposed to forces, in accordance with some embodiments of the present disclosure. As illustrated, only radial pressure forces acting on sealing ring assembly 400 are shown in FIG. 4, although axial pressure forces and axial and radial contact forces may be present during operation (e.g., from a bore, a piston land, other sealing element, or other surface). For example, contact forces may have magnitudes and directions that balance the pressure forces in each direction (e.g., such that ring segments 420 and 432 do not move relative to one another). FIG. 4 shows a view directed azimuthally, with axis 482 directed in the radial direction, and axis 480 directed axially. Sealing ring assembly 400 includes a first ring and a second ring. The first ring includes ring segment 420, and the second ring includes ring segment 432. Ring segment 432 includes recess 440, arranged at an interface between ring segment 432 and ring segment 420. Sealing ring assembly is configured to seal between high-pressure region 450 and low-pressure region 452 (e.g., in the bore of a cylinder). Force 402, directed radially outward, is caused by pressure forces from high-pressure region 450 acting on a portion of a high-pressure boundary of the sealing ring assembly 400. Force 401, directed radially inward, is caused by pressure forces from a clearance gap, asperities, or both, between sealing ring assembly 400 and a cylinder bore. Force 403, acting on ring segment 432, is caused by gas pressure from gas in an interface between ring segments 420 and 432 (e.g., a similar force may act on ring segment 420 in the opposite direction). Because recess 440 is open to low-pressure region 452 by passage 441, any high-pressure gas that gets into the interface between ring segments 420 and 432 is reduced in pressure, as illustrated by force 403 (e.g., with reduced magnitude from reduced pressure at recess 440). For example, high-pressure gas that flows into gap will flow through recess 440 into passage 441 to low-pressure region 452. Resultant force 405 is the net radial force experienced by ring segment 432 from pressure forces during operation and is less than resultant force 305 for similar operating conditions. For example, similar operating conditions may include pressures in high-pressure regions 350 and 450 being similar, and pressures in low-pressure regions 352 and 452 being similar. For example, for a smaller resultant force 405, the smaller the contact force from a bore (e.g., and reduced wear rate) that may occur during operation. Accordingly, the inclusion of recess 440 allows sealing ring assembly 400 to experience a reduced resultant force from pressure forces (e.g., resultant force 405) on a sealing element (e.g., ring segment 432) as compared to a resultant force (e.g., resultant force 305) acting on ring segment 332 of sealing ring assembly 300.

A recess open to a low-pressure region may cause pressures at interfaces between sealing elements of a sealing ring assembly to be relatively lower (e.g., than if the recess were not included). For example, the pressure at the recess may, but need not, be equal to the pressure of the low-pressure region. The pressure being relatively less than that of the high-pressure region may be sufficient to provide pressure-locking. Accordingly, a recess need only cause the pressure to be reduced partially from the high-pressure region. For example, greater pressure reduction at the recess may provide stronger pressure locking (e.g., by reducing a resultant pressure force on the sealing element).

Figure 5:
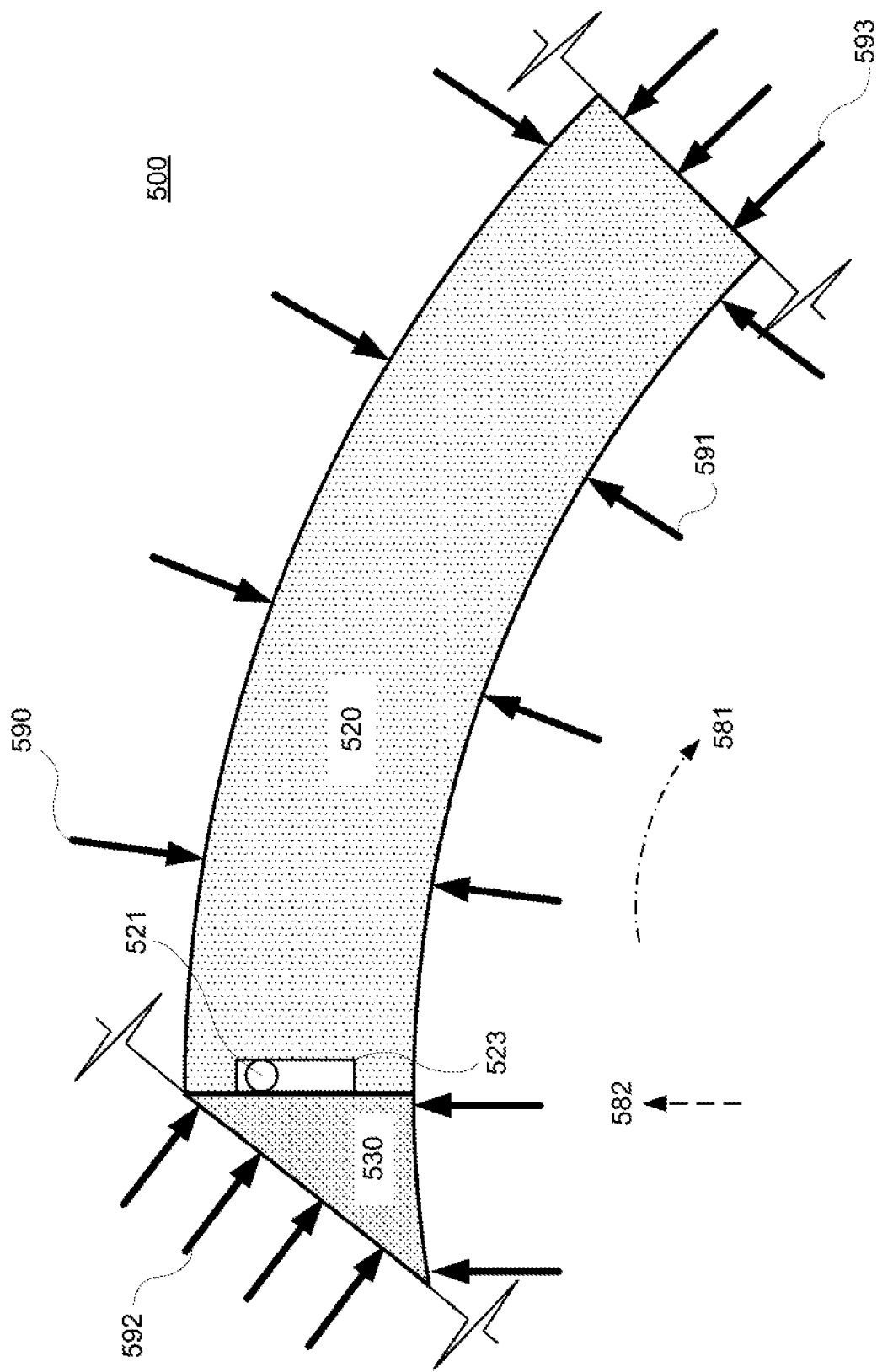
FIG. 5 shows a cross-sectional view of a portion of an illustrative sealing ring assembly exposed to pressure and contact forces, in accordance with some embodiments of the present disclosure.

FIG. 5 shows a cross-sectional view of a portion of an illustrative sealing ring assembly 500 exposed to pressure and contact forces, in accordance with some embodiments of the present disclosure. FIG. 5 shows a view directed axially, with axis 582 directed in the radial direction, and arrow 581 illustrating the azimuthal direction. Ring segment 520 and gap cover element 530 constitute a portion of sealing ring assembly 500, which may include any suitable number of ring segments, gap over elements, or other suitable components not illustrated in FIG. 5 (e.g., such as additional rings). Sealing ring assembly 500 is arranged in a groove of a piston and is configured to seal against a land. Sealing ring assembly 500 is configured to seal a high-pressure region from a low-pressure region of a cylinder (e.g., a bore thereof). As illustrated in FIG. 5, the sealing ring assembly is exposed to force 590 (i.e., directed radially inward from pressure in a clearance gap), force 591 (i.e., directed radially outwards from a high-pressure region), force 592 (i.e., directed azimuthally from pressure), and force 593 (i.e., directed azimuthally opposite force 592 from pressure). It will be understood that forces may be present in the axial direction but are not shown in FIGS. 5-7 for simplicity. Ring segment 520 includes recess 523, which is coupled to a low-pressure region (not shown) by passage 521. Forces can also be applied at the interface between ring segment 520 and gap cover element 530. For example, if ring 520 and gap cover element 530 are not accelerating relative to the piston, or each other, then the forces on each of ring segment 520 and gap cover element 530 balance in all directions. Further description of interfacial forces is provided in the context of FIGS. 6-7.

FIG. 6 shows a cross-sectional exploded view of a portion of illustrative sealing ring assembly 600 exposed to forces, in accordance with some embodiments of the present disclosure. As illustrated, only pressure forces acting on sealing ring assembly 600 are shown in FIG. 6, although contact forces may be present during operation (e.g., from a bore, a piston land, other sealing element, or other surface). For example, contact forces may have magnitudes and directions that balance the pressure forces in each direction (e.g., such that ring segment 620 and gap cover element 630 do not move relative to one another, a piston, or both). FIG. 6 shows a view directed axially, with axis 682 directed in the radial direction, and arrow 681 illustrating the azimuthal direction. Ring segment 620 and gap cover element 630 constitute a portion of sealing ring assembly 600, which may include any suitable number of ring segments, gap over elements, or any other suitable components. Sealing ring assembly 600 is configured to be arranged in a groove of a piston and is configured to seal against a land. Sealing ring assembly 600 is configured to seal a high-pressure region from a low-pressure region of a cylinder (e.g., a bore thereof). Sealing ring assembly 600 is exposed to force 601, which is directed radially inward from pressure in a clearance gap. Sealing ring assembly 600 is also exposed to force 602, which is directed radially outwards (e.g., caused by gas from a high-pressure region). Sealing ring assembly 600 is also exposed to force 603, which is directed azimuthally from pressure between a gap cover element (e.g., similar to gap cover element 530 of FIG. 5) and ring segment 620. Resultant force 505 is the net azimuthal force experienced by ring segment 620 from pressure forces during operation. For example, a larger resultant force 605 may reduce the effectiveness of the seal between ring segment 620 and gap cover element 630, may increase wear of the sealing ring assembly 600, or both.

FIG. 7 shows a cross-sectional exploded view of a portion of illustrative sealing ring assembly 700 exposed to forces, in accordance with some embodiments of the present disclosure. Sealing ring assembly 700 is similar to sealing ring assembly 500 of FIG. 5. As illustrated, only pressure forces acting on sealing ring assembly 700 are shown in FIG. 7, although contact forces may be present during operation (e.g., from a bore, a piston land, other sealing element, or other surface). For example, contact forces may have magnitudes and directions that balance the pressure forces in each direction (e.g., such that ring segment 720 and gap cover element 730 do not move relative to one another). FIG. 7 shows a view directed axially, with axis 782 directed in the radial direction, and arrow 781 illustrating the azimuthal direction. Ring segment 720 and gap cover element 730 constitute a portion of sealing ring assembly 700, which may include any suitable number of ring segments, gap over elements, or any other suitable components. Sealing ring assembly 700 is configured to be arranged in a groove of a piston and is configured to seal against a land. Sealing ring assembly 700 is configured to seal a high-pressure region from a low-pressure region of a cylinder (e.g., a bore thereof). Sealing ring assembly 700 is exposed to force 701, which is directed radially inward from pressure in a clearance gap. Sealing ring assembly 700 is also exposed to force 702, which is directed radially outwards (e.g., caused by gas from a high-pressure region). Sealing ring assembly 700 is also exposed to force 703, which is directed azimuthally from pressure between gap cover element 730 and ring segment 720. Recess 740 in ring segment 720 is open to a low-pressure region (not shown), thus causing force 703 to be less than force 603 of FIG. 6, for similar operating conditions. Resultant force 705 is the net azimuthal force experienced by ring segment 720 from pressure forces during operation. For example, a smaller resultant force 705, relative to resultant force 605, may aid in sealing between ring segment 720 and gap cover element 730 by increasing the contact force between their mating surfaces, may reduce wear of the sealing ring assembly 700, or both.

Figure 8:
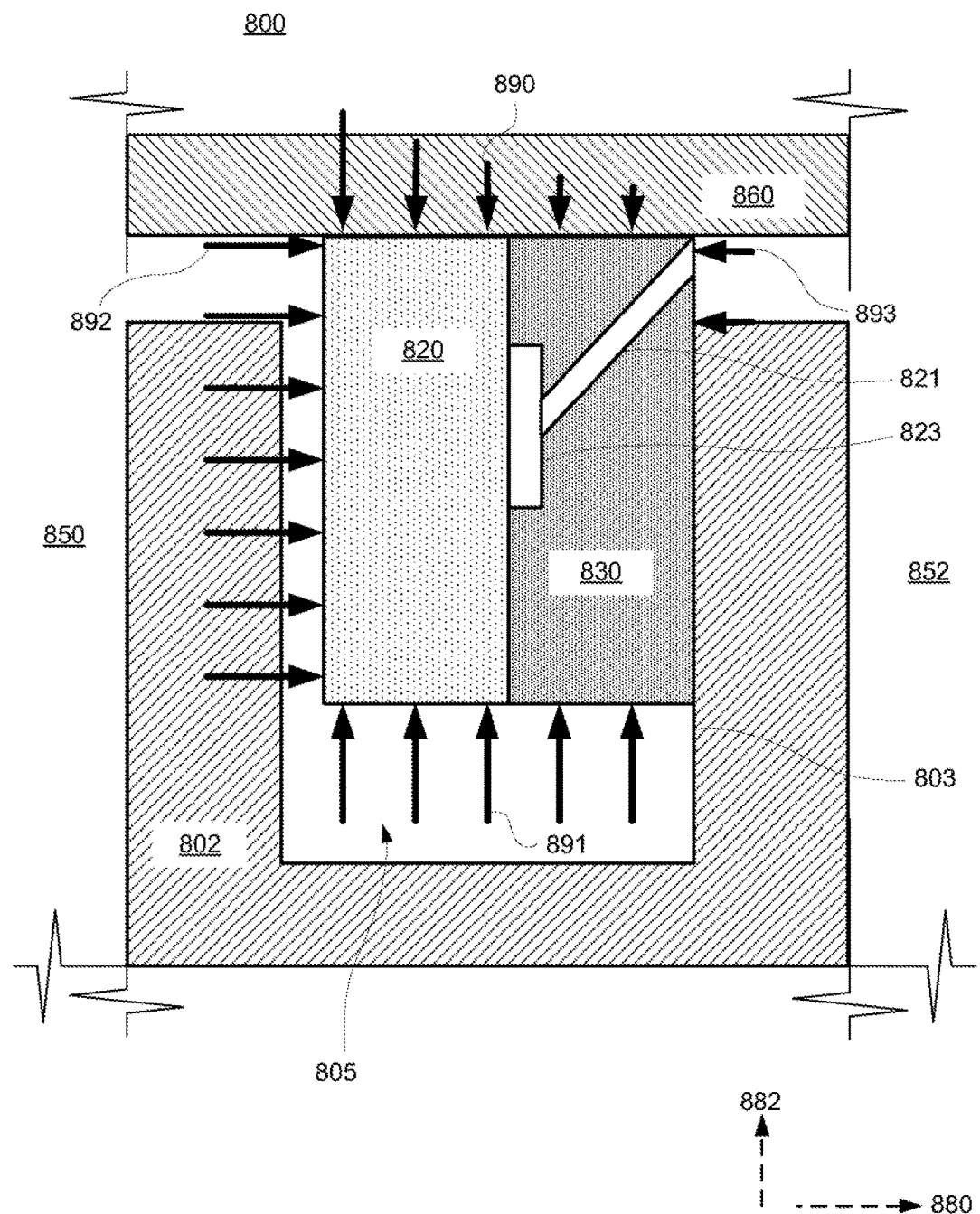
FIG. 8 shows a cross-sectional view of an illustrative piston and cylinder assembly, with a sealing ring assembly exposed to pressure forces, in accordance with some embodiments of the present disclosure.

FIG. 8 shows a cross-sectional view of illustrative piston and cylinder assembly 800, with a sealing ring assembly (e.g., including rings 820 and 830) exposed to pressure forces, in accordance with some embodiments of the present disclosure. FIG. 8 shows a view directed azimuthally, with axis 882 directed in the radial direction, and axis 880 directed axially. While only pressure forces are illustrated in FIG. 8, it will be understood that the sealing ring assembly may experience contact forces from a bore, a piston land, another sealing ring assembly, or a combination thereof. Ring 820 and ring 830 constitute the sealing ring assembly, and each may include one or more ring segments. Although not shown in FIG. 8, either or both of ring 820 and 830 may include one or more gap cover elements. The sealing ring assembly is arranged in groove 805 of piston 802 and is configured to seal against land 803. The sealing ring seals high-pressure region 850 from low-pressure region 852 against cylinder 860 (e.g., against a bore of cylinder 260). As illustrated in FIG. 8, the sealing ring assembly is exposed to force 892 (i.e., directed axially rearward from high-pressure region 850), force 891 (i.e., directed radially outwards from high-pressure region 850), force 890 (i.e., directed radially inwards from pressure in a clearance gap between the sealing ring assembly and the cylinder 860), and force 893 (i.e., directed axially forward from pressure in low-pressure region 852). It will be understood that forces may be present in the azimuthal direction but are not shown in FIGS. 8-10 for simplicity. Ring 820 includes recess 823, which is coupled to low-pressure region 852 by passage 821. Forces can also be applied at the interface between rings 820 and 830. For example, if ring 820 and ring 830 are not accelerating relative to piston 802, or each other, then the forces on each of ring 820 and 830 balance in all directions. Further description of interfacial forces is provided in the context of FIGS. 9-10.

FIG. 9 shows a cross-sectional exploded view of an illustrative sealing ring assembly 900 exposed to forces, in accordance with some embodiments of the present disclosure. As illustrated, only axial pressure forces acting on sealing ring assembly 900 are shown in FIG. 9, although pressure forces in other directions and contact forces may be present during operation (e.g., from a bore, a piston land, other sealing element, or other surface). For example, contact forces may have magnitudes and directions that balance the pressure forces in each direction (e.g., such that ring 920 and ring 930 do not move relative to one another, relative to the piston, or both). FIG. 9 shows a view directed axially, with axis 982 directed in the radial direction, and arrow 980 illustrating the axial direction. Ring 920 and ring 930 constitute at least a portion of sealing ring assembly 900, which may include any suitable number of ring segments, gap over elements, or any other suitable components. Sealing ring assembly 900 is configured to be arranged in a groove of a piston and is configured to seal against a land. Sealing ring assembly 900 is configured to seal a high-pressure region from a low-pressure region of a cylinder (e.g., a bore thereof). Ring 920 is exposed to force 903, which is directed axially rearward and caused by gas in the high-pressure region. Force 906 from gas pressure between ring 920 and 930 acts on the mating surface of ring 920. Resultant force 925 is the net axial force experienced by ring 920 from pressure forces during operation. For example, a smaller resultant force 925 may reduce the effectiveness of the seal between ring 920 and ring 930. Forces 907 and 908 act on ring 930, caused by pressure between rings 920 and 930, and gas from the low-pressure region, respectively.

FIG. 10 shows a cross-sectional exploded view of an illustrative sealing ring assembly 1000 exposed to forces, in accordance with some embodiments of the present disclosure. As illustrated, only axial pressure forces acting on sealing ring assembly 1000 are shown in FIG. 10, although pressure forces in other directions and contact forces may be present during operation (e.g., from a bore, a piston land, other sealing element, or other surface). For example, contact forces may have magnitudes and directions that balance the pressure forces in each direction (e.g., such that rings 1020 and 1030 do not move relative to one another). FIG. 10 shows a view directed azimuthally, with axis 1082 directed in the radial direction, and axis 1080 directed axially. Sealing ring assembly 1000 includes a first ring (i.e., ring 1020) and a second ring (i.e., ring 1030). Ring 1030 includes recess 1040, arranged at an interface between ring 1020 and ring 1030. Sealing ring assembly is configured to seal between a high-pressure region and a low-pressure region (e.g., in the bore of a cylinder). Recess 1040 is open to the low-pressure region by passage 1041. Ring 1020 is exposed to force 1003, which is directed axially rearward and caused by gas in the high-pressure region. Force 1006 from gas pressure between ring 1020 and 1030 acts on the mating surface of ring 1020. Resultant force 1025 is the net axial force experienced by ring 1020 from pressure forces during operation. For example, a larger resultant force 1025 may improve the effectiveness of the seal between ring 1020 and ring 1030. Forces 1007 and 1008 act on ring 1030, caused by pressure between rings 1020 and 1030, and gas from the low-pressure region, respectively. Because recess 1040 is open to the low-pressure region by passage 1041, any high-pressure gas that gets into the gap is reduced in pressure, as illustrated by resultant force 1025 (e.g., with reduced magnitude from reduced pressure at recess 1040). For example, high-pressure gas that flows into the interface between rings 1020 and 1030 will flow through recess 1040 into passage 1041 to the low-pressure region. Resultant force 1025 is the net axial force experienced by ring 1020 from pressure forces during operation and is less than resultant force 925 of FIG. 9 for similar operating conditions. For example, similar operating conditions may include pressures in the high-pressure regions being similar, and pressures in the low-pressure regions being similar. For example, a larger resultant force 1025 may improve the effectiveness of the seal between ring 1020 and ring 1030, may improve wear of the sealing ring assembly, or both. Forces 1007 and 1008 act on ring 1030, caused by pressure between rings 1020 and 1030, and gas from the low-pressure region, respectively.

It will be understood that FIGS. 2-10 are merely illustrative, and that a sealing ring assembly may be configured to for axial, radial, or azimuthal pressure-locking, or any suitable combination thereof. For example, a sealing ring assembly may include one or more recesses, arranged at corresponding interfaces, configured to provide axial, radial, and azimuthal pressure-locking. Further, an interface between sealing elements may include any suitable shape (e.g., flat, segmented, contoured), and be arranged in any suitable direction (e.g., normal to, parallel to, or at an angle to any directional axis), or combination of directions. Any of the illustrative sealing ring assemblies of FIGS. 2-10 may be combined or modified in accordance with present disclosure.

Figure 11:
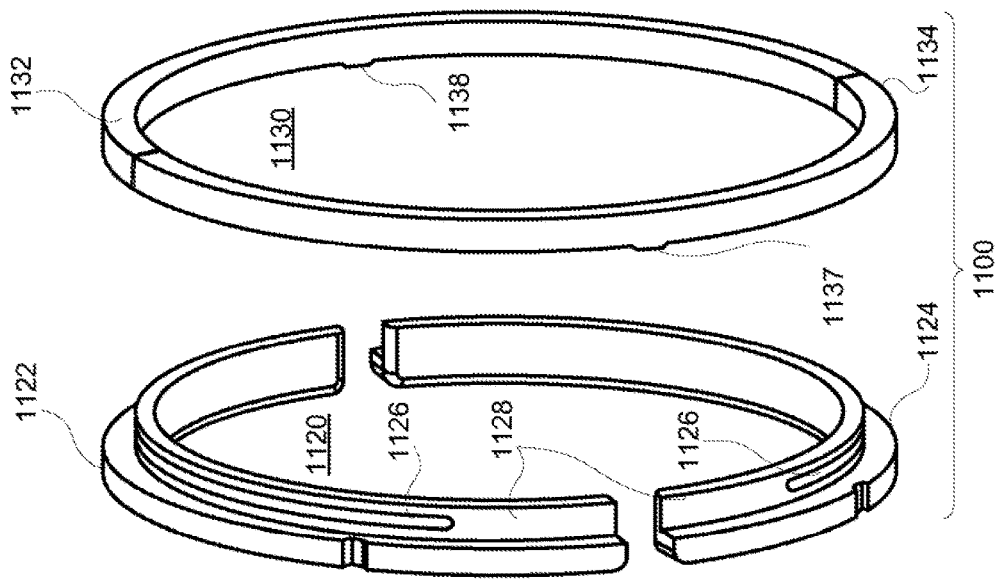
FIG. 11 shows an exploded perspective view of a portion of an illustrative sealing ring assembly, in accordance with some embodiments of the present disclosure.

FIG. 11 shows an exploded perspective view of a portion of an illustrative sealing ring assembly, in accordance with some embodiments of the present disclosure. Sealing ring assembly 1100 includes first ring 1120 and second ring 1130. Although first ring 1120 and second ring 1130 are illustratively shown as having two segments and two splits, a ring may include any suitable number of segments and splits (e.g., one or more), in accordance with the present disclosure.

First ring 1120 includes first ring segment 1122 and second ring segment 1124. Additionally, first ring 1120 may be referred to as a ring having two splits or being split into two ring segments. The first ring being "split" may refer to a fabrication process (e.g., the first ring is fabricated as a single part and separated into two ring segments), or the general geometry of first ring segments 1122 and 1124 arranged end to end and extending azimuthally around, wholly or partially, a ring groove of a piston. The split itself refers to the interface between first ring segments 1122 and 1124, which may include a gap, contact between the first ring segments, or a combination thereof.

Second ring 1130 includes second ring segment 1132 and second ring segment 1134. Additionally, second ring 1130 may be referred to as a ring having two splits or being split into two ring segments. Any suitable number of anti-rotation features may be included and may be configured to engage with any suitable number of corresponding features of a first or second ring, or segments thereof. In some embodiments, second ring 1130 includes anti-rotation features 1137 and 1138 that engages with first ring 1120, or interfaces thereof, to prevent substantial azimuthal movement of second ring segments 1132 and 1134.

Figure 12:
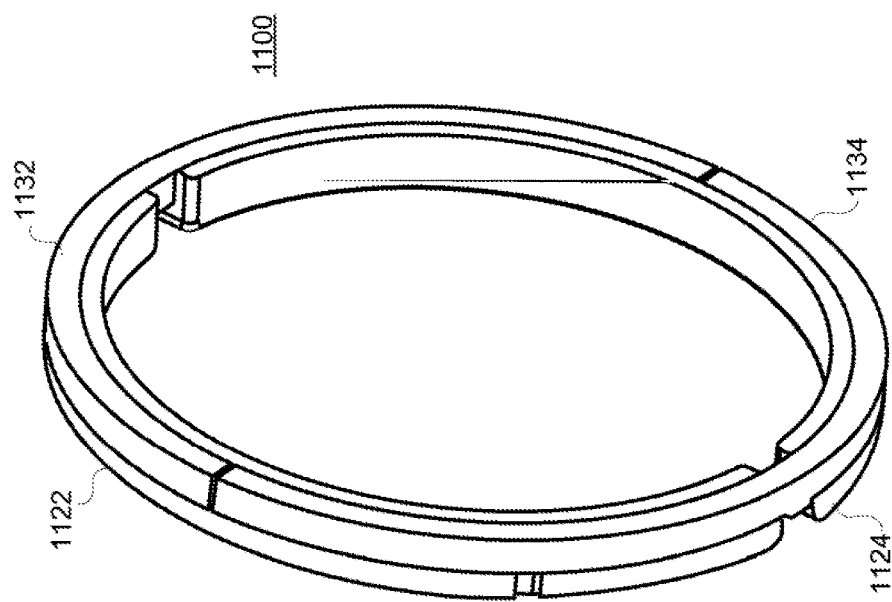
FIG. 12 shows a perspective view of the illustrative sealing ring assembly of FIG. 11, in accordance with some embodiments of the present disclosure.

First ring segments 1122 and 1124 may each include groove 1126, which extends circumferentially along an outer radial surface of extension 1128, which may also be split (e.g., as shown in FIG. 11). Groove 1126 may, for example, be open to a low-pressure boundary of sealing ring assembly 1100 during operation. Accordingly, groove 1126 may allow pressure-locking of sealing ring assembly 1100 during suitable operation. For example, groove 1126 may be configured to use a difference in pressure to lock (e.g., via pressure-locking) differing ring segments to one another (e.g., first ring segments 1122 and 1124 to ring segments 1132 and 1134). As illustrated, groove 1126 does not extend azimuthally along extension 1128 to the interfaces between first ring segments 1122 and 1124 and thus will not be open to a high-pressure region during operation. FIG. 12 shows a perspective view of illustrative sealing ring assembly 1100 of FIG. 11, as assembly, in accordance with some embodiments of the present disclosure.

FIG. 13 shows a cross section view of illustrative sealing ring assembly 1300 including a feature for pressure locking, in accordance with some embodiments of the present disclosure. Coordinate axes 1370 (i.e., radial) and 1372 (i.e., axial) are provided in FIG. 13 for purposes of clarity. Sealing ring assembly 1300 is configured to be arranged in a ring groove of piston 1310.

The feature for pressure locking (i.e., groove 1380, as shown illustratively in FIG. 13) may aid in maintaining sealing ring assembly 1300 in an intended configuration during operation, which is referred to herein as pressure locking. During operation (e.g., in a device including a piston and cylinder assembly), groove 1380 may be configured to include gas at a pressure close to a pressure of a low-pressure boundary of sealing ring assembly 1300. For example, during operation, groove 1380 may achieve, or nearly achieve, a pressure of a low-pressure region (e.g., low-pressure region 1311) at the rear of sealing ring assembly 1300. Although groove 1380 is illustrated as integral to front ring 1320, groove 1380 could also be included in rear ring 1330, or both front ring 1320 and rear 1330. Further, groove 1380 may be replaced with any suitable recess configured to apply pressure to suitable faces of the sealing ring assembly. For example, a recess may include any suitable shape, having any suitable geometric properties, in accordance with the present disclosure.

To illustrate, in the absence of groove 1380, as the "twin ring" (e.g., sealing ring assembly 1300) wears, rear ring 1330 may tend to wear at a faster rate than front ring 1320. This is due to the pressure dropping axially along the axial length of sealing ring assembly 1300 (e.g., dropping from left to right as illustrated by the top arrows 1390 pointing down). Accordingly, the pressure on the outside of the rear ring is lower than the peak pressure (e.g., in high-pressure region 1313). If high pressure gas gets between the front ring 1320 and rear ring 1330 (e.g., and thus exposes the rear segments of ring 1330 to a pressure of high-pressure region 1313) rear ring 1330 will then tend to be more strongly biased radially outwards than front ring 1320. As rear ring 1330 wears at a greater rate, a gap between the rear ring segments will open. Gas from the high-pressure region then more easily gets between the segments, increasing the outward force, and a runaway condition may occur. Further, the flow of gas from high pressure region 1313 into the gap may be characterized as leaking past the seal.

In some embodiments, a groove (e.g., groove 1380) is formed (e.g., cut) in one of the rings at the radial interface between front ring 1320 and rear ring 1330. The groove may be included in the interface at the outer surface of front ring 1320, the inner surface of rear ring 1330, or both. In some embodiments, the groove is centered on, and open to, a split in rear ring 1330. The ends of groove 1380 are closed before reaching the split in front ring 1320 (e.g., as illustrated by groove 1126 in FIG. 11). When sealing ring assembly 1300 is in operation (e.g., in a piston-cylinder device), the split in rear ring 1330 is at low pressure because it is open to the rear of sealing ring assembly 1300 and closed off from the front of sealing ring assembly 1300. Therefore, groove 1380 between the two rings is also at low pressure, ensuring a low pressure between the front and rear segments which helps in them staying radially locked together.

Illustrative radial pressure fields 1390 (i.e., acting radially inward) and 1392 (i.e., acting radially outward) may act on sealing ring assembly 1300 during operation. Radial pressure field 1392 is directed radially outward and is created by gas from a high-pressure region acting on the radially inner surface of sealing ring assembly 1300. Radial pressure field 1390 is directed radially inward and is created by gas in the clearance between sealing ring assembly 1300 and a corresponding bore of a cylinder.

FIG. 14 shows a cross section view of illustrative sealing ring assembly 1300 of FIG. 13 showing rear ring gap 1430, in accordance with some embodiments of the present disclosure. FIG. 14 is shown from section 1399 of FIG. 13 (i.e., viewing in a direction radially inward, opposite the direction of axis 1370). Groove 1380 is open to low-pressure region 1311 and is sealed from high-pressure region 1313 by the front ring 1320.

Figure 15:
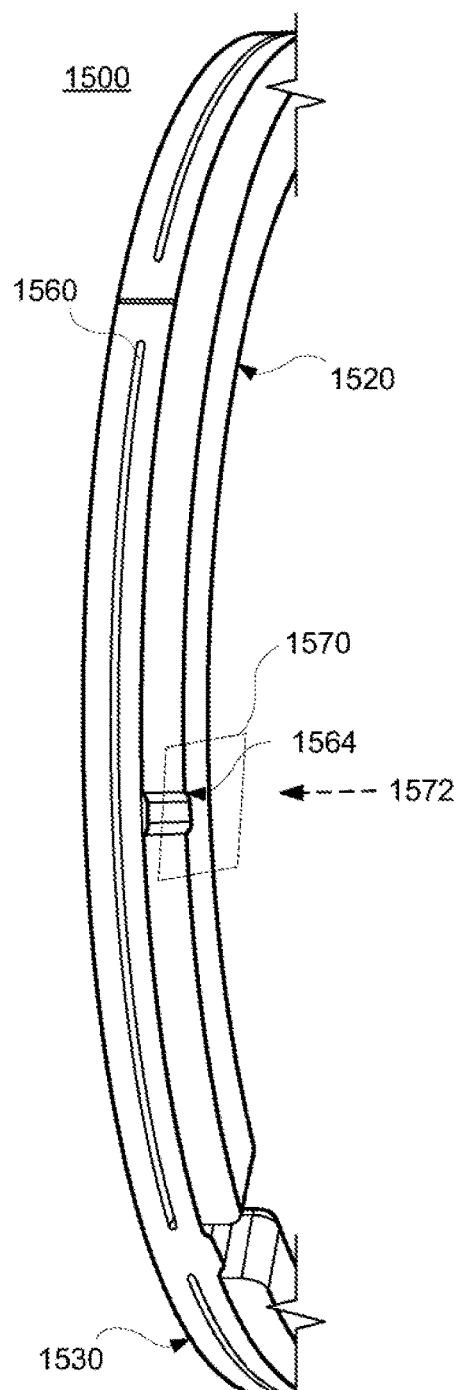
FIG. 15 shows a perspective view of a portion of an illustrative sealing ring assembly including a feature for balancing radial forces, in accordance with some embodiments of the present disclosure.
Figure 16:
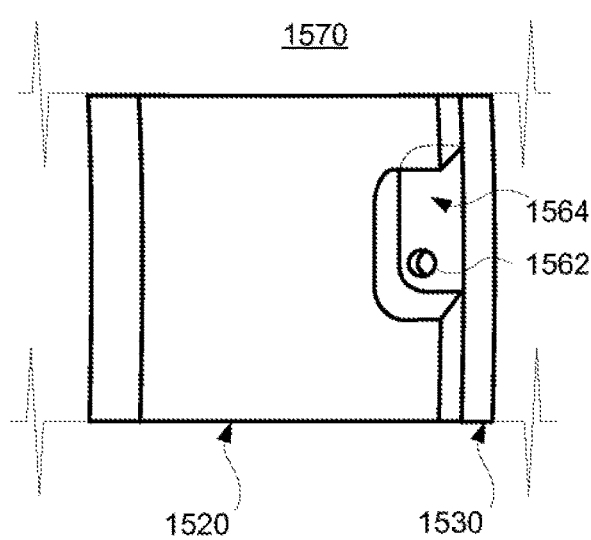
FIG. 16 shows a perspective view of a portion of the illustrative sealing ring assembly of FIG. 10A, including a feature for balancing radial forces, in accordance with some embodiments of the present disclosure.

FIG. 15 shows a perspective view of a portion of illustrative sealing ring assembly 1500 including a feature for balancing radial forces, in accordance with some embodiments of the present disclosure. FIG. 16 shows a perspective view of portion 1570 of illustrative sealing ring assembly 1500 of FIG. 15, in accordance with some embodiments of the present disclosure. Sealing ring assembly 1500 includes first ring 1520 (e.g., a front ring) and second ring 1530 (e.g., a rear ring). Second ring 1530 includes pocket 1560, which extends circumferentially in an outer radial surface of the second ring. In some embodiments, pocket 1560 is configured to receive high pressure gas (e.g., from a high-pressure region of a piston cylinder device). In some embodiments, second ring 1530 may include orifice 1562, which may allow gas to flow from a high-pressure boundary of sealing ring assembly 1500 (e.g., exposed to a high-pressure region) to pocket 1560. For example, orifice 1562 may be open to pocket 1560, allowing the gas to flow. First ring 1520 may include recess 1564, or other feature, to allow orifice 1562 to receive high pressure gas during operation. Orifice 1562 may include a hole, passage, or other opening which may allow suitable gas flow.

The portion of sealing ring assembly 1500 shown by section 1570 of FIG. 15, viewed in direction 1572, is illustrated in FIG. 16. Recess 1564 in first ring 1520 allows a relatively open flow path for high pressure gas to enter orifice 1562. Accordingly, in some circumstances, sealing ring assembly 1500 may be configured to seal between a high-pressure region and a low-pressure region, and exhibit relatively lower wear (e.g., as compared to sealing ring assembly 1100 of FIG. 11) because of pocket 1560 for radial pressure balancing. Under some circumstances, first ring 1520 and second ring 1530 may move azimuthally relative to one another as sealing ring assembly 1500 wears. Accordingly, recess 1564 may include a slot (e.g., as shown in FIG. 16) rather than a circular hole, such that the pressurization pathway remains open as the ring wears.

Figure 17:
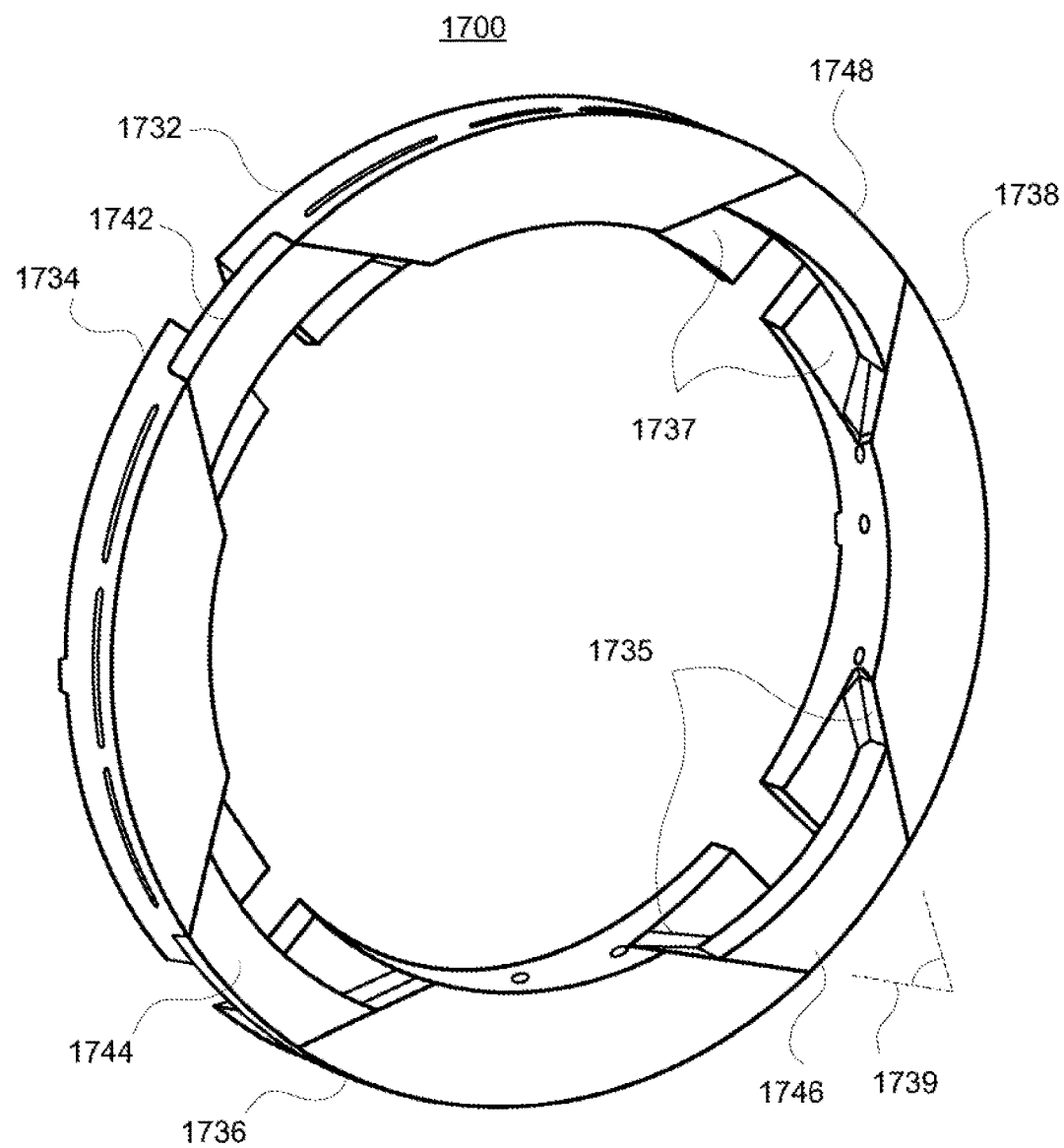
FIG. 17 shows a view of the rear face of an illustrative sealing ring assembly, in accordance with some embodiments of the present disclosure.

FIG. 17 shows a view of the rear face of illustrative sealing ring assembly 1700, in accordance with some embodiments of the present disclosure. Sealing ring assembly 1700 includes ring segments 1732, 1734, 1736, and 1738, as well as gap cover elements 1742, 1744, 1746, and 1748. Sealing ring assembly 1700 illustratively corresponds to sealing ring assembly 200 after undergoing relatively less wear than sealing ring assembly 230 (e.g., ring segment 266 corresponds to ring segment 206 after undergoing an intermediate amount of wear).

Face 1737 (e.g., axially forward of gap cover element 1746 and facing axially rearward) of the interface between ring segments 1732 and 1738 is nominally a flat plane perpendicular to the axis of the ring. As shown in FIG. 17, sides 1735 of the interface between ring segments 1736 and 1738 are symmetric about a plane passing through the center of the radial split in the ring. The sides of gap cover elements 1742, 1744, 1746, and 1748 need not be symmetric, but are shown symmetric for clarity. The sides together form an included angle (e.g., included angle 1739 in FIG. 17 is formed by gap cover element 1736) that is widest at the radially inner surface of the ring and narrowest at the radially outer surface. The mating surfaces between gap cover element 1746 and ring segments 1736 and 1738 may include at least one recess configured to be open to a low-pressure region and not open to (e.g., sealed from) a high-pressure region. For example, the recess may be included in sides 1735, front faces, corresponding mating surfaces of gap cover element 1746, or any combination thereof. Similarly, a recess may be included in any suitable sealing surface between any of illustrative ring segments 1732, 1734, 1736, and 1738 and suitable gap cover elements 1742, 1744, 1746, and 1748.

Figure 18:
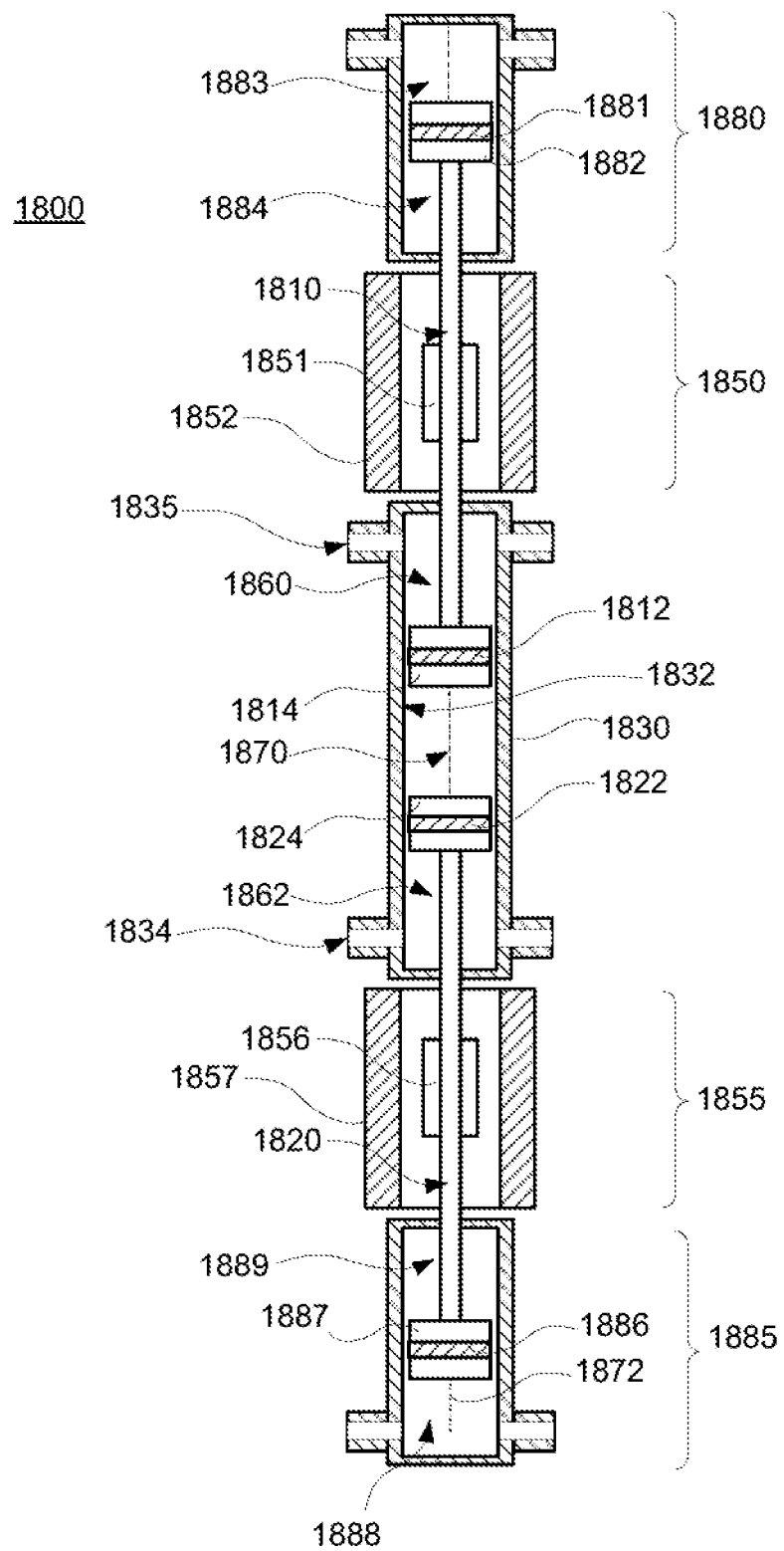
FIG. 18 shows a cross section view of an illustrative engine including two piston assemblies, that each include a sealing ring assembly in accordance with some embodiments of the present disclosure.

FIG. 18 shows a cross-sectional view of illustrative device 1800 including two free piston assemblies 1810 and 1820 that include respective sealing ring assemblies 1812 and 1822 in accordance with some embodiments of the present disclosure. In some embodiments, device 1800 may include linear electromagnetic machines 1850 and 1855 to convert between kinetic energy of respective free piston assemblies 1810 and 1820 and electrical energy. In some embodiments, device 1800 may include gas regions 1860 and 1862, which may, for example, be at a relatively lower pressure than gas region 1870 (e.g., a high-pressure region) for at least some, if not most, of a cycle (e.g., an engine cycle, or an air compression cycle). For example, gas regions 1860 and 1862 (e.g., low pressure regions) may be open to respective breathing ducting (e.g., an intake manifold, an intake system, an exhaust manifold, an exhaust system). To illustrate, breathing ports 1834 and 1835 are configured to provide reactants to, and remove exhaust from, bore 1832 of cylinder 1830. In a further example, gas regions 1860 and 1862 may be vented to atmosphere (e.g., be at about 1.01 bar absolute pressure). In some embodiments, device 1800 may include gas springs 1880 and 1885, which may be used to store and release energy during a cycle in the form of compressed gas (e.g., a driver section). For example, free piston assemblies 1810 and 1820 may each include respective pistons 1882 and 1887, having grooves for respective sealing ring assemblies 1881 and 1886, to seal respective gas regions 1883 and 1888 (e.g., high-pressure regions) from respective gas regions 1884 and 1889 (e.g., low-pressure regions).

Cylinder 1830 may include bore 1832, centered about axis 1872. In some embodiments, free piston assemblies 1810 and 1820 may translate along axis 1872, within bore 1832, allowing gas region 1870 to compress and expand. For example, gas region 1870 may be at relatively high pressure as compared to gas region 1860 for at least some of a stroke of free piston assemblies 1810 and 1820 (e.g., which may translate along axis 1872 in opposed piston synchronization). Sealing ring assemblies 1812 and 1822 may seal gas region 1870 from respective gas regions 1860 and 1862 within bore 1832. In some embodiments, free piston assemblies 1810 and 1820 may include respective pistons 1814 and 1824, and respective sealing ring assemblies 1812 and 1822 which may be arranged in respective corresponding grooves of pistons 1814 and 1824. It will be understood that gas regions 1860 and 1862, and gas region 1870, may change volume as free piston assemblies 1810 and 1820 move or are otherwise positioned at different locations along axis 1872. The portions of respective sealing ring assemblies 1812 and 1822 nearest gas region 1870 are each termed the front, and the portion of sealing ring assemblies 1812 and 1822 nearest respective gas regions 1860 and 1862 are each termed the rear. Sealing ring assemblies 1812 and 1822 may each include a high-pressure boundary, which may each depend on a pressure in gas region 1870. For example, a high-pressure boundary of sealing ring assembly 1812 may be open to gas region 1870 (e.g., coupled by one or more orifices, or other opening), and have a corresponding pressure the same as (e.g., if gas from gas region 1870 is unthrottled in the sealing ring assembly), or less than (e.g., if gas from gas region 1870 is throttled in the sealing ring assembly), the pressure of gas region 1870. Sealing ring assemblies 1812 and 1822 may each include a low-pressure boundary, which may depend on a gas pressure in respective gas regions 1860 and 1862. For example, a low-pressure boundary of sealing ring assembly 1812 may be open to gas region 1860 and have a corresponding pressure about the same as the pressure of gas region 1860. In some embodiments, as sealing ring assemblies 1812 an 1822 axially pass over respective ports 1835 and 1834 (e.g., and corresponding port bridges, although not shown), they may experience uneven, or reduced, inward force from bore 1832.

In some embodiments, pistons 1814 and 1824 may each include one or more grooves into which one or more respective sealing ring assemblies may be arranged. For example, as shown in FIG. 18, pistons 1814 and 1824 may each include one groove, into which sealing ring assembly 1812 and sealing ring assembly 1822 may be installed, respectively. In a further example, although not shown in FIG. 18, piston 1814 may include two grooves, in which two respective sealing ring assemblies may be installed. In a further example, piston 1814 may include two grooves, the first sealing ring assembly 1812, and the second (not shown), arranged to the rear of sealing ring assembly 1812, but with its front nearer to gas region 1860, thereby sealing pressure in gas region 1860 to pressure between the two sealing ring assemblies (e.g., which may be less than pressure in gas region 1870). Accordingly, a sealing ring assembly may be used to seal any suitable high pressure and low-pressure regions from each other.

In some embodiments, free piston assemblies 1810 and 1820 may include respective magnet sections 1851 and 1856, which interact with respective stators 1852 and 1857 to form respective linear electromagnetic machines 1850 and 1855. For example, as free piston assembly 1810 translates along axis 1872 (e.g., during a stroke of an engine cycle), magnet section 1851 may induce current in windings of stator 1852. Further, current may be supplied to respective phase windings of stator 1852 to generate an electromagnetic force on free piston assembly 1810 (e.g., to effect motion of free piston assembly 1810).

In some embodiments, pistons 1814 and 1824, sealing ring assemblies 1812 and 1822, and cylinder 1830 may be considered a piston and cylinder assembly. In some embodiments, device 1800 may be an engine, an air compressor, any other suitable device having a piston and cylinder assembly, or any combination thereof. In some embodiments, device 1800 need not include two free piston assemblies. For example, cylinder 1830 could be closed (e.g., with a cylinder head), and free piston assembly 1810 alone may translate along axis 1872.

It will be understood that the present disclosure is not limited to the embodiments described herein and can be implemented in the context of any suitable system. In some suitable embodiments, the present disclosure is applicable to reciprocating engines and compressors. In some embodiments, the present disclosure is applicable to free-piston engines and compressors. In some embodiments, the present disclosure is applicable to combustion and reaction devices such as a reciprocating engine and a free-piston engine. In some embodiments, the present disclosure is applicable to non-combustion and non-reaction devices such as reciprocating compressors, free-piston heat engines, and free-piston compressors. In some embodiments, the present disclosure is applicable to gas springs. In some embodiments, the present disclosure is applicable to oil-free reciprocating and free-piston engines and compressors. In some embodiments, the present disclosure is applicable to oil-free free-piston engines with internal or external combustion or reactions. In some embodiments, the present disclosure is applicable to oil-free free-piston engines that operate with compression ignition, chemical ignition (e.g., exposure to a catalytic surface, hypergolic ignition), plasma ignition (e.g., spark ignition), thermal ignition, any other suitable energy source for ignition, or any combination thereof. In some embodiments, the present disclosure is applicable to oil-free free-piston engines that operate with gaseous fuels, liquid fuels, or both. In some embodiments, the present disclosure is applicable to linear free-piston engines. In some embodiments, the present disclosure is applicable to engines that can be combustion engines with internal combustion/reaction or any type of heat engine with external heat addition (e.g., from a heat source such as waste heat or an external reaction such as combustion).

The foregoing is merely illustrative of the principles of this disclosure, and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A sealing ring assembly comprising:
a first sealing element comprising a first mating surface; and
a second sealing element comprising a second mating surface;
a high-pressure boundary extending across at least a portion of the first sealing element and across at least a portion of the second sealing element;
a low-pressure boundary extending across at least a portion of the first sealing element and across at least a portion of the second sealing element;
a rear axial face configured to seal against a land of a piston; and
a radially outer face configured to seal against a bore of a cylinder between the high-pressure boundary and the low-pressure boundary;
wherein at least one of the first mating surface and the second mating surface comprises a recess open to the low-pressure boundary and not open to the high-pressure boundary, such that the first mating surface is configured to be sealed against the second mating surface by a first force acting on the first sealing element and a second force acting on the second sealing element.

2. The sealing ring assembly of claim 1, wherein the first force acting on the first sealing element is directed opposite to the second force acting on the second sealing element.

3. The sealing ring assembly of claim 1, wherein the recess is configured to cause the first and second forces to maintain a relative position of the first sealing element and the second sealing element.

4. The sealing ring assembly of claim 1, wherein the recess comprises a groove.

5. The sealing ring assembly of claim 1, wherein the recess is a first recess of the first mating surface, and wherein the second mating surface comprises a second recess configured to interface with the first recess.

6. The sealing ring assembly of claim 1, wherein the first sealing element comprises a first ring segment, and wherein the second sealing element comprises a second ring segment.

7. the sealing ring assembly of claim 1, wherein the first sealing element comprises a ring segment, and wherein the second sealing element comprises a gap cover element.

8. The sealing ring assembly of claim 1, wherein at least one of the first and second sealing elements comprises a radial pressure-balancing feature, configured to cause a radially inward force.

9. The sealing ring assembly of claim 1, wherein the first and second mating surface seal against each other to prevent the recess from being open to the high-pressure boundary.

10. A piston assembly comprising:
a piston comprising a circumferential groove; and
a sealing ring assembly arranged in the circumferential groove, the sealing ring assembly comprising:
a first sealing element comprising a first mating surface; and
a second sealing element comprising a second mating surface;
a high-pressure boundary extending across at least a portion of the first sealing element and across at least a portion of the second sealing element; and
a low-pressure boundary extending across at least a portion of the first sealing element and across at least a portion of the second sealing element;
wherein at least one of the first mating surface and the second mating surface comprises a recess open to the low-pressure boundary and not open to the high-pressure boundary, such that the first mating surface is sealed against the second mating surface by a first force acting on the first sealing element and a second force acting on the second sealing element.

11. The piston assembly of claim 10, wherein the first force acting on the first sealing element is directed opposite to the second force acting on the second sealing element.

12. The piston assembly of claim 10, wherein the recess is configured to cause the first and second force to maintain a relative position of the first sealing element and the second sealing element.

13. The piston assembly of claim 10, wherein the piston further comprises a land and is configured to move within a bore of a cylinder, and wherein the sealing ring assembly further comprises:
a rear axial face configured to seal against the land; and
a radially outer face configured to seal against the bore between the high-pressure boundary and the low-pressure boundary.

14. The piston assembly of claim 10, wherein the recess comprises a groove.

15. The piston assembly of claim 10, wherein the recess is a first recess of the first mating surface, and wherein the second mating surface comprises a second recess configured to interface with the first recess.

16. The piston assembly of claim 10, wherein the first sealing element comprises a first ring segment, and wherein the second sealing element comprises a second ring segment.

17. The piston assembly of claim 10, wherein the first sealing element comprises a ring segment, and wherein the second sealing element comprises a gap cover element.

18. The piston assembly of claim 10, wherein at least one of the first and second sealing elements comprises a radial pressure-balancing feature, configured to cause a radially inward force.

19. The piston assembly of claim 10, wherein the first and second mating surfaces seal against each other to prevent the recess from being open to the high-pressure boundary.

20. A device comprising:
a cylinder comprising a bore comprising a high-pressure region and a low-pressure region;
a piston comprising a circumferential groove, wherein the piston is configured to move axially within the bore;
a sealing ring assembly arranged in the circumferential groove and configured to seal against the bore to define the high-pressure region and the low-pressure region, the sealing ring assembly comprising;
a first sealing element comprising a first mating surface; and a second sealing element comprising a second mating surface;

wherein at least one of the first and second mating surfaces comprises a recess open to the low-pressure region and not open to the high-pressure region, such that the first mating surface is sealed against the second mating surface by a first force acting on the first sealing element and a second force acting on the second sealing element.

21. The device of claim 20, wherein:
the circumferential groove further comprises an axially rear land; and
the sealing ring assembly is further configured to seal against the axially rear land.

22. The device of claim 20, wherein the first force acting on the first sealing element is directed opposite to the second force acting on the second sealing element.

23. The device of claim 20, wherein the recess is configured to cause the first and second forces to maintain a relative position of the first sealing element and the second sealing element.

24. The device of claim 20, wherein the sealing ring assembly further comprises a radially outer face configured to seal against the bore.

25. The device of claim 20, wherein the sealing ring assembly further comprises:
a first boundary extending across at least a portion of the first sealing element and at least a portion of the second sealing element, and that is open to the high-pressure region; and
a second boundary extending across at least a portion of the first sealing element and at least a portion of the second sealing element, and that is open to the low-pressure region, wherein the recess is open to the boundary and not open to the second boundary.

26. The device of claim 20, wherein the first sealing element comprises a first ring segment, and wherein the second sealing element comprises a second ring segment.

27. The device of claim 20, wherein the first sealing element comprises a ring segment, and wherein the second sealing element comprises a gap cover element.

28. The device of claim 20, wherein the first and second mating surface are configured to seal against each other to prevent the recess from being open to the high-pressure region.

* * * * *

UNITED STATES PATENT AND TRADEMARK OFFICE
CERTIFICATE OF CORRECTION

PATENT NO. : 10,443,727 B2
APPLICATION NO. : 16/100131
DATED : October 15, 2019
INVENTOR(S) : Matt Svrcek et al.

Page 1 of 1

It is certified that error appears in the above-identified patent and that said Letters Patent is hereby corrected as shown below:

In the Claims

At Column 19, Claim 9, Line 66, please change "surface" to --surfaces--
At Column 20, Claim 12, Line 26, please change "force" to --forces--
At Column 22, Claim 28, Line 20, please change "surface" to --surfaces--

Signed and Sealed this
Twenty-sixth Day of November, 2019

Andrei Iancu
*Director of the United States Patent and Trademark Office*